(12) United States Patent
Lai

(10) Patent No.: US 9,829,991 B2
(45) Date of Patent: Nov. 28, 2017

(54) INTERACTIVE IMAGE DEVICE AND INTERACTIVE METHOD THEREOF

(71) Applicant: Chun-Ying Lai, Taipei (TW)

(72) Inventor: Chun-Ying Lai, Taipei (TW)

(73) Assignee: Jiashao Chen, Taipei (TW)

( * ) Notice: Subject to any disclaimer, the term of this patent is extended or adjusted under 35 U.S.C. 154(b) by 0 days.

(21) Appl. No.: 15/140,436

(22) Filed: Apr. 27, 2016

(65) Prior Publication Data

US 2016/0320857 A1    Nov. 3, 2016

(30) Foreign Application Priority Data

Apr. 28, 2015   (TW) .............. 104113480 A

(51) Int. Cl.
*G06F 3/02*   (2006.01)
*H04N 1/00*   (2006.01)

(52) U.S. Cl.
CPC ....... *G06F 3/0202* (2013.01); *H04N 1/00347* (2013.01)

(58) Field of Classification Search
CPC .. G06F 3/0202; H04N 1/00347; H04R 1/028; B42D 15/022
See application file for complete search history.

(56) References Cited

U.S. PATENT DOCUMENTS

| | | |
|---|---|---|
| 4,791,741 A | 12/1988 | Kondo |
| 5,182,872 A | 2/1993 | Lee |
| 5,359,374 A | 10/1994 | Schwartz |
| 5,499,465 A | 3/1996 | Manico |
| 5,920,634 A | 7/1999 | Chiquette |
| 6,695,669 B2 | 2/2004 | Piepenbrink |
| 7,356,154 B1 * | 4/2008 | Kotzin ............ H04R 1/028 381/123 |
| 7,376,564 B2 | 5/2008 | Selg |
| 8,476,519 B2 | 7/2013 | Liotta |
| 8,492,640 B2 | 7/2013 | Chang |
| 8,601,726 B2 | 12/2013 | Mayer |
| 8,763,286 B2 | 7/2014 | Jin |
| 8,955,240 B1 * | 2/2015 | Loftus ............ B42D 15/022 40/124.03 |
| 2002/0046034 A1 | 4/2002 | Loudermilk |
| 2005/0028418 A1 | 2/2005 | Pargman |

(Continued)

FOREIGN PATENT DOCUMENTS

| | | |
|---|---|---|
| CN | 1552001 | 12/2004 |
| CN | 201216381 | 4/2009 |

(Continued)

*Primary Examiner* — Richard Hong
(74) *Attorney, Agent, or Firm* — IPR Works, LLC

(57) ABSTRACT

The present invention is directed to an interactive image device and interactive method thereof for a traditional photo frame or a fameless painting, the device comprises a frame body provided with a fastening position, a display surface for display an image, an effect unit for generate effects, a trigger unit and a circuit module to enable or disable the effect unit in responding the operation of the trigger unit by a user. The user is able to get different interactive effect feedbacks by inserting the trigger unit to the fastening position each time, thus the present invention can easily integrate the displayed image with interactive effects and interact with users by novel operating methods.

20 Claims, 19 Drawing Sheets

(56) References Cited

U.S. PATENT DOCUMENTS

2011/0057020 A1    3/2011  Colby
2013/0139417 A1*  6/2013  Mayer ................ B42D 15/022
                                                    40/124.03

FOREIGN PATENT DOCUMENTS

| CN | 203576127 | 5/2014 |
| CN | 204020374 | 12/2014 |
| TW | 200913504 | 3/2009 |
| TW | 200931321 | 7/2009 |

\* cited by examiner

INTERACTIVE IMAGE DEVICE AND INTERACTIVE METHOD THEREOF

CROSS-REFERENCE TO RELATED APPLICATION

The present patent application/patent claims the benefit of priority of T.W. Patent Application No. 104113480, filed on Apr. 28, 2015, and entitled "INTERACTIVE IMAGE DEVICE AND INTERACTIVE METHOD THEREOF," the contents of which are incorporated in full by reference herein.

FIELD OF THE INVENTION

The present invention relates to an image device, especially an interactive image device.

BACKGROUND OF THE INVENTION

With the improvement of living conditions, walls of houses are often decorated with objects for plane display, such as photo frames, frameless paintings and oil paintings. However, these objects for plane display have same disadvantages, namely lack of text description and voice narration. Hence, when people have questions about the image inside, repeated explanations are often needed. Also, it is a pity that we only have images without any sounds.

For example, detailed description of famous paintings displayed in public exhibition space such as galleries or art galleries often relies on labels set around the works, those texts on the labels cannot interact with people nor play any sounds.

In order to combine images with sounds, messages and other effects, at present, the most familiar technology or device is the so-called digital photo frame which can combine with electronic pictures and sounds, go with text marquee or backgrounds and record any information of photos. However, compared with conventional photo frames, costs of digital photo frames are higher. What is more, visual effects of electronic versions of art works such as frameless paintings or oil paintings by scanning are heavily downgraded. Though some traditional photo frames are designed to offer sound effects, their designs are very similar with buttons for manual operation, which lacks of a sense of beauty and uniqueness that showpieces or souvenirs should have.

Therefore, the present invention is usable for designing an interactive image device integrating literal statement with sounds or any other interactive effect in a simple and economic way to make an image have not only the image itself. Also the present invention provides an interactive method for manual operation of users to interact with images to raise the value of conventional plane art devices.

BRIEF SUMMARY OF THE INVENTION

One goal of the present invention is to provide an interactive image device that integrates a presented image with interactive effects, also provide an interactive method for manual operation of users to solve problems above.

In one exemplary embodiment, the present invention provides an interactive image device, at least comprising: a frame, provided with at least one fastening position, a housing space inside the frame and at least one display surface for presenting at least one image; an effect unit, arranged along the edge of the frame or inside the frame, for producing at least one effect; a circuit module, arranged in the housing space, at least comprising a control unit, a switch unit and a memory unit, wherein the control unit is electrically connected to the effect unit, the switch unit and the memory unit, and wherein the switch unit comprises at least one switch; and a trigger unit, wherein at one end of the trigger unit is provided with at least one trigger portion for mating with the at least one switch so that the switch unit generates a setting signal or a start signal according to the on or off state of the at least one switch respectively, and wherein:

When the trigger unit is located in the fastening position, the at least one trigger portion makes the at least one switch in a first switch state so that the switch unit generates the setting signal and outputs the setting signal to the control unit, wherein the control unit generates a storage value in accordance with the setting signal, saves the storage value in the memory unit and selectively disables the effect unit to stop producing the at least one effect ; and when the trigger unit is not located in the fastening position, the at least one trigger portion makes the at least one switch in a second switch state so that the switch unit generates the start signal and outputs the start signal to the control unit, wherein the control unit reads the storage value from the memory unit and enables the effect unit in accordance with the storage value to produce the at least one effect corresponding to the storage value.

In this exemplary embodiment, the first switch state is ON while the second switch state is OFF, or on the contrary the first switch state could be OFF while the second switch state is ON; the setting signal has a voltage level of logic 0 while the start signal has a voltage level of logic 1, or on the contrary the setting signal could have a voltage level of logic 1 while the start signal has a voltage level of logic 0.

In this exemplary embodiment, the control unit generates each the storage value corresponding to each number of times respectively by cumulating the number of times of receiving the setting signal and each the storage value is usable for producing different the at least one effect respectively; the at least one effect comprises a sound playing, a light changing, an odor releasing, a vibration generating or the image of the display surface changing.

In this exemplary embodiment, the present invention provides an interactive method for an image device, at least comprising: move at least one trigger unit into a housing space of a frame presenting at least an image; move the at least one trigger unit until it is located in a fastening position of the frame; mate the at least one switch with at least one trigger portion of the at least one trigger unit; make the at least one switch in a first switch state; generate a setting signal; generate a storage value in accordance with the setting signal; save the storage value in a memory unit; selectively stop producing at least one effect; move the at least one trigger unit until it is not located in the fastening position of the frame; mate the at least one switch with the at least one trigger portion of the at least one trigger unit; make the at least one switch in a second switch state; generate a start signal; read the storage value from the memory unit; and produce the at least one effect corresponding to the storage value.

In another exemplary embodiment, the present invention provides an interactive image device, at least comprising: a frame, provided with at least one fastening position, a housing space inside the frame and at least one display surface for presenting at least one image; an effect unit, arranged along the edge of the frame or inside the frame, for producing at least one first effect and at least one second effect; a circuit module, arranged in the housing space, at least comprising a control unit, a switch unit and a memory unit, wherein the control unit is electrically connected to the effect unit, the switch unit and the memory unit; and a trigger unit, wherein at one end of the trigger unit is provided with at least one trigger portion for mating with the switch unit so that the switch unit generates a first setting signal, a second setting signal or a start signal respectively, and wherein:

When the trigger unit with the at least one trigger portion in a first direction is located in the fastening position, the switch unit generates the first setting signal and outputs the first setting signal to the control unit, wherein the control unit generates a first storage value in accordance with the first setting signal, saves the first storage value in the memory unit and selectively disables the effect unit to stop producing the at least one first effect and the at least one second effect; when the trigger unit with the at least one trigger portion in a second direction is located in the fastening position, the switch unit generates the second setting signal and outputs the second setting signal to the control unit, wherein the control unit generates a second storage value in accordance with the second setting signal, saves the second storage value in the memory unit and selectively disables the effect unit to stop producing the at least one first effect and the at least one second effect; and when the trigger unit is not located in the fastening position, the switch unit generates the start signal and outputs the start signal to the control unit, wherein the control unit reads the memory unit, and wherein:

If the memory unit stores the first storage value, the control unit enables the effect unit in accordance with the first storage value to produce the at least one first effect corresponding to the first storage value; and if the memory unit stores the second storage value, the control unit enables the effect unit in accordance with the second storage value to produce the at least one second effect corresponding to the second storage value.

In this exemplary embodiment, at least one trigger portion has an asymmetric shape or build-in sensing elements to identify a side A and a side B of the at least one trigger portion, and wherein: the at least one trigger portion in the first direction has one angle between the side A and the display surface; and the at least one trigger portion in the second direction has another angle between the side A and the display surface.

In this exemplary embodiment, the control unit generates each the first storage value and the second storage value corresponding to each number of times respectively by cumulating the number of times of receiving the first setting signal and the second setting signal, and each the first storage value and the second storage value is usable for producing different the at least one first effect and the at least one second effect respectively; the at least one first effect and the at least one second effect comprises a sound playing, a light changing, an odor releasing, a vibration generating or the image of the display surface changing.

In above exemplary embodiments, the frame comprises a slot arranged along the edge of the frame, and wherein the slot is usable for connecting through the housing space so that the trigger unit is able to move into or remove from the housing space through the slot to be located or not to be located in the fastening position respectively; the trigger unit is provided with at least one first limiter having a limiting surface with its cross-sectional area partially larger than the internal diameter of the slot, and wherein when the trigger unit moves into the housing space and locates in the fastening position, the at least one first limiter leans against the frame by the limiting surface so that the trigger unit stays in the fastening position; at another end of the trigger unit is provided with at least one holder portion for manual operation of the trigger unit; the housing space comprises at least one second limiter mating with the shape of the trigger portion, the fastening position is usable for fastening the trigger unit by the at least one second limiter.

Therefore, the interactive image device and the interactive method thereof of the present invention provide an interactive image device that integrates a presented image with interactive effects and also an interactive method for manual operation of users.

BRIEF DESCRIPTION OF THE DRAWINGS

The advantages of the device realized by applying the principles of the invention will emerge more clearly from the description below of a number of examples of embodiment provided by way of a non-limiting example with reference to the accompanying drawings in which:

FIG. 5a is a circuit diagram of one exemplary embodiment of the present invention corresponding to FIG. 4a.

FIG. 10a is a circuit diagram of another exemplary embodiment of the present invention corresponding to FIG. 9a.

FIG. 12a is a circuit diagram of another exemplary embodiment of the present invention corresponding to FIG. 11a.

DETAILED DESCRIPTION OF THE INVENTION

The advantage and spirit of the present invention can be further understood by the following detailed description of the invention and the accompanying drawings.

Figure 1A:
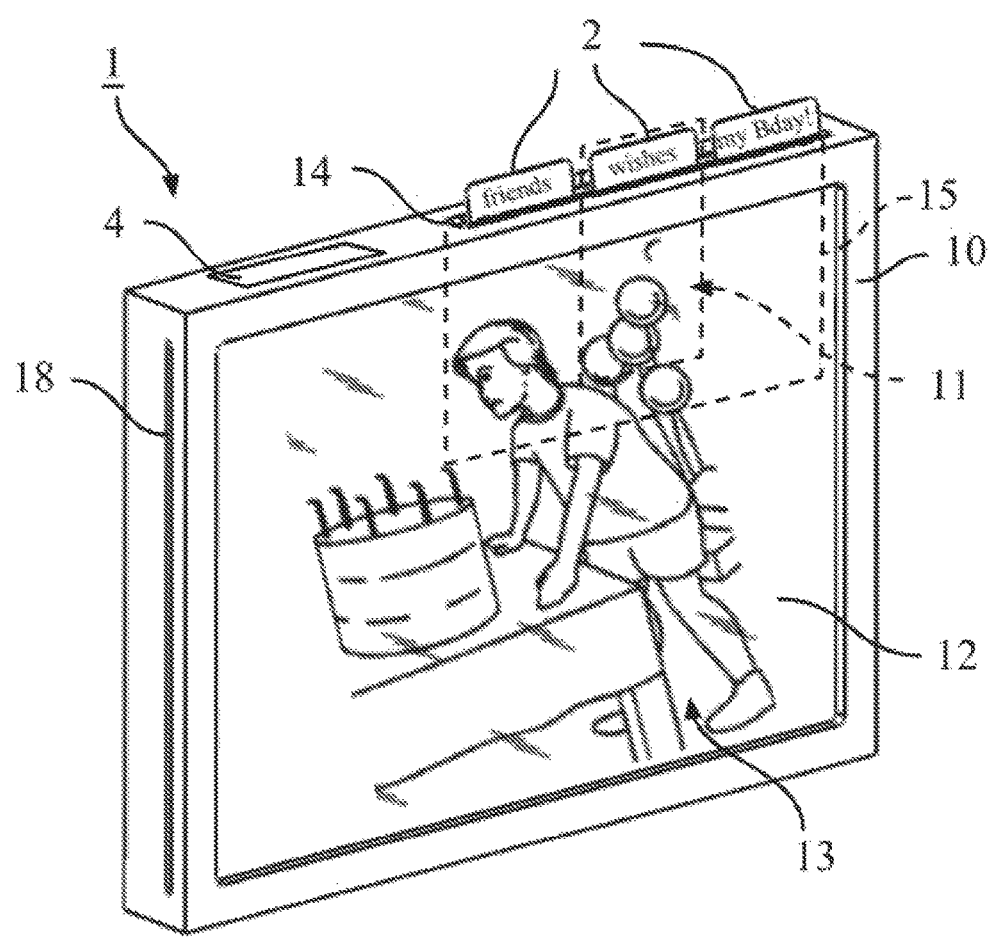
FIG. 1a and FIG. 1b are 3D schematic diagrams of the interactive image device of the present invention.
Figure 1B:
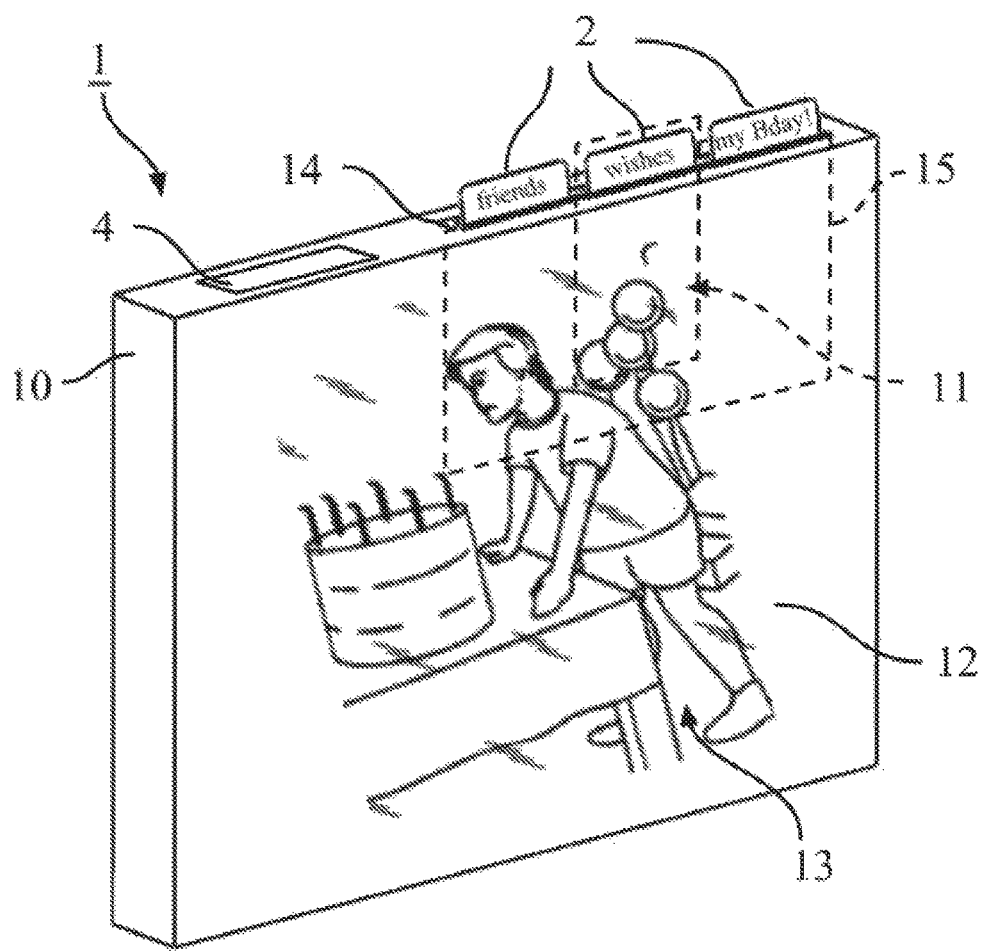

As shown in FIG. 1a, the disclosure of an interactive image device 1 in the present invention, at least comprising a frame 10, a trigger unit 2 and an effect unit 4. The frame 10 has a shape which is not limited to be rectangular and has at least one display surface 12 used for presenting at least one image 13. The image 13 can be a 2D or 3D photo, painting, calligraphy, creation, various kinds of art work or any memorable content. Like conventional photo frames or painting frames, the image 13 is carried by paper or any other 2D or 3D material and is inserted into the frame 10 via an opening 18 arranged along the edge of the frame 10, to be presented on the display surface 12. Moreover, such as the frameless painting shown in FIG. 1b, the image 13 can be carried by a canvas or any other soft material used for wrapping around the display surface 12 of the frame 10 and presenting the image 13.

The effect unit 4 can be a speaker, a LED/non-LED lighting module and an odor releaser etc., arranged along the edge of the frame 10, or can be a vibrator and a step motor etc., arranged inside the frame 10, for producing at least one interactive effect feedback respectively such as a sound playing, a light changing, an odor releasing, a vibration generating or the image 13 of the display surface 12 changing. Preferably, the effect unit 4 is a speaker for playing a sound.

A slot 14 arranged along the edge of the frame 10 is usable for connecting through a housing space 15 set inside the frame 10. By passing through the slot 14, it allows a manual operation of a user to move the at least one trigger unit 2 freely from the outside of the frame 10 into the inside housing space 15 of the frame 10 or remove the at least one trigger unit 2 freely from the inside housing space 15 of the frame 10 to the outside of the frame 10, while the trigger unit 2 is thus located in or not located in a fastening position 11 arranged in the frame 10 respectively.

When the trigger unit 2 is moved into the housing space 15 completely and cannot be moved any more, the trigger unit 2 is thus located in the fastening position 11. At the fastening position 11, the trigger unit 2 is fastened and cannot leave with the gravity force or any other accidental forces by the user. In addition, the housing space 15 is provided selectively with a limiting mechanism (not shown in figures) or a limiter which clamps the end of the trigger unit 2 inside the housing space 15 and forces the trigger unit 2 not to leave the frame 10 completely to avoid the missing or dropping of the trigger unit 2.

Moreover, a trough (not shown in figures) is arranged selectively along the edge of the frame 10 for installing an interface module which is provided with a control panel comprising at least a USB port, a power switch and a volume adjuster etc.

One frame 10 can mate with single or multiple trigger unit 2. Each trigger unit 2 can trigger a circuit inside the housing space 15 by moving or removing operations mentioned above. The circuit generates a storage value during moving operation while enabling the effect unit 4 to produce the corresponding effect during removing operation. The details will be described below.

Figures 2A, 2B:
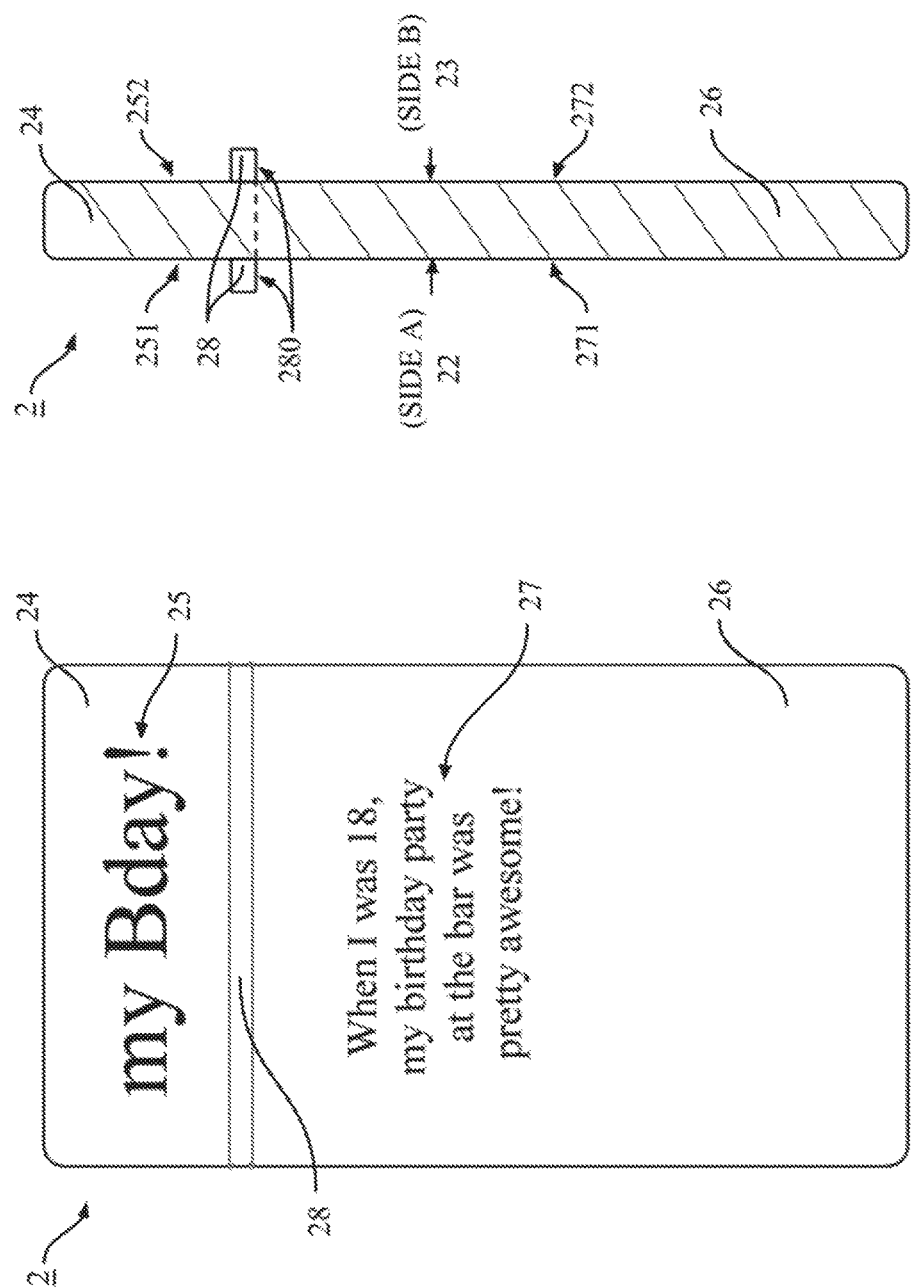
FIG. 2a is a front view diagram of the trigger unit of the present invention.
FIG. 2b is a side view diagram of the trigger unit of the present invention.

As shown in FIG. 2a, at one end of the trigger unit 2 is provided with at least one trigger portion 26 and at another end is provided with at least one holder portion 24. Between the trigger portion 26 and the holder portion 24 of the trigger unit 2 is provided with a first limiter 28. The trigger portion 26 has but not limited to a plate-like shape, used for mating with the circuit inside the housing space 15 so that the circuit generates different signals under each trigger states. By means of the holder portion 24, a user can manually operate the trigger unit 2 to move it into or remove it from the housing space 15 in an easy way. The holder portion 24 is not limited to a plate-like shape, and it can be any shapes that are easily held by a user, such as a cylinder, a cuboid or a hexagonal column etc. Besides, the trigger unit 2 is usable for a label containing texts of captions and descriptions near a painting or an art work, wherein the holder portion 24 can carry a title 25 containing any image or text by printing, laser engraving, electroplating or any other methods to record the name or the theme of the image 13 while the trigger portion 26 can carry a description 27 containing any image or text in a similar way to describe information about the image 13 in details.

As shown in FIG. 2b, the first limiter 28 has a limiting surface 280 with its cross-sectional area partially larger than the internal diameter of the slot 14. When the trigger unit 2 is moved into the housing space 15 and is located in the fastening position 11, the first limiter 28 leans against the frame 10 by the limiting surface 280 so that the trigger unit 2 stays in the fastening position 11 and cannot be moved anymore, which results in the effect of the travel limit. Moreover, the holder portion 24 and the trigger portion 26 can be but not limited to at the same level, in other words, an angle could be existed between the holder portion 24 and the trigger portion 26 while the bend of the trigger unit 2 corresponding to the angle can act as the first limiter 28. When the trigger unit 2 is moved into the housing space 15 and is located in the fastening position 11, the bend leans against the frame 10 so that the trigger unit 2 cannot be moved forward and stays in the fastening position 11, which results in the same effect of the travel limit.

The trigger unit 2 can have a plate-like shape comprising a side A 22 and a side B 23, wherein the both sides can carry the title 25 and the description 27 mentioned above to provide richer information about the image 13. The title 25 and the description 27 corresponding to the side A 22 and a side B comprise respectively a first title 251 located in the side A 22 of the holder portion 24, a first description 271 located in the side A 22 of the trigger portion 26, a second title 252 located in the side B 23 of the holder portion 24 and a second description 272 located in the side B 23 of the trigger portion 26.

When the trigger unit 2 is moved into the housing space 15 and is located in the fastening position 11, the holder portion 24 including the title 25, the first title 251 and the second title 252 extends outwardly along the edge of the frame 10 while the trigger portion 26 including the description 27, the first description 271 and the second description 272 is covered by the frame 10. Once a user wants to read the information hidden inside the frame 10, the trigger portion 26 can be exposed to outside the frame 10 by pulling out the trigger unit 2, which also causes the circuit inside the housing space 15 to enable the effect unit 4 to generate an interactive effect.

For example, if the image 13 presented on the display surface 12 is a photo related to a birthday party, the title 25, the first title 251 and the second title 252 can record the date of the party while the description 27, the first description 271 and the second description 272 can record the time and the place of the party. The effect can be a sound playing which records the voice of people during the party. As a result, when a user pulls out the trigger unit 2, he or she not only can realize the date and the place of the birthday party visually but also can hear the voice of the party, just like being there.

I. The First Exemplary Embodiment

Figure 3:
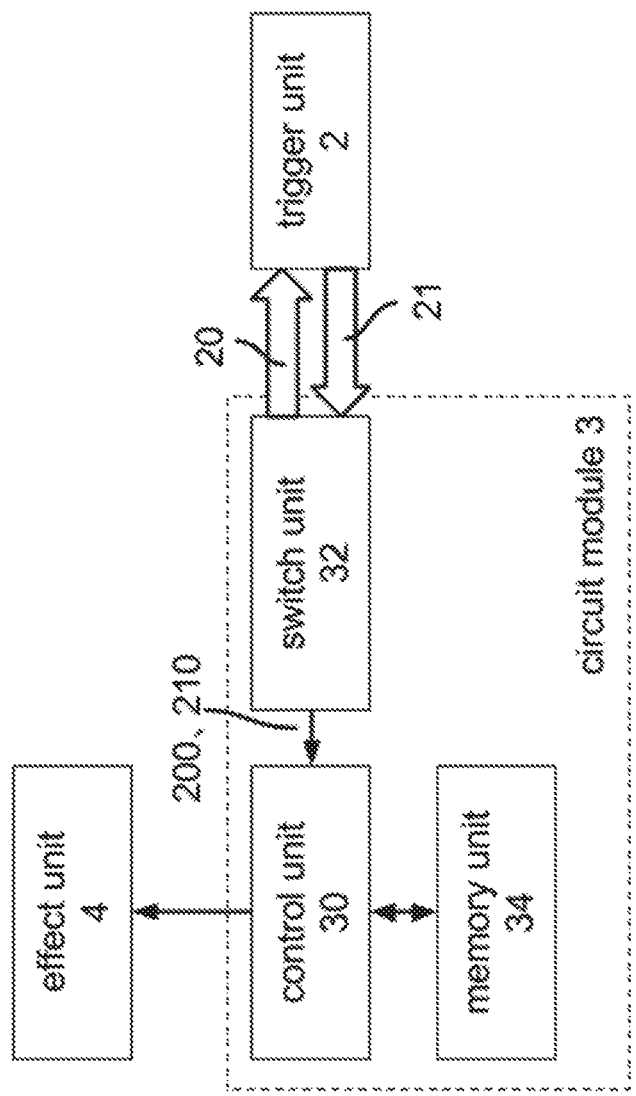
FIG. 3 is a systematic block diagram of one exemplary embodiment of the present invention.

According to one exemplary embodiment of the present invention, as shown in FIG. 3, which is suitable for not to identify the direction when the trigger portion 26 of the trigger unit 2 is located in the fastening position 11. Inside the housing space 15 is provided with a circuit module 3 for response to the trigger unit 2 to enable or disable the effect unit 4, wherein the circuit module 3 at least comprising a control unit 30, a switch unit 32 and a memory unit 34. The effect unit 4, the switch unit 32 and the memory unit 34 are electrically connected to the control unit 30 which is usable for receiving the output signals which are generated by the switch unit 32 mated with the trigger unit 2.

When the trigger unit 2 is moved 21 into the housing space 15 and is located in the fastening position 11, the trigger portion 26 of the trigger unit 2 makes the switch unit 32 generate a setting signal 210 and output the setting signal 210 to the control unit 30, wherein the control unit 30 generates a storage value in accordance with the setting signal 210, saves the storage value in the memory unit 34, selectively disables the effect unit 4 to stop producing any effect and selectively turns off the system power supply to lower the power consumption after the storage value is saved.

When the trigger unit 2 is removed 20 from the housing space 15 and is not located in the fastening position 11, the trigger portion 26 of the trigger unit 2 makes the switch unit 32 generate a start signal 200 and output the start signal 200 to the control unit 30, wherein the control unit 30 reads the storage value from the memory unit 34, enables the effect unit 4 in accordance with the storage value for producing at least one effect corresponding to the storage value and selectively turns on the system power supply to keep every unit working normally while receiving the start signal 200.

The memory unit 34 provides the storage function digitally, including flash memory, embedded memory, EEPROM, DRAM, SRAM, Cache, Register or any other type of digital memory. The storage value can be at least a one-bit data stored in a memory address of the memory unit 34, which can be read or overwritten by the control unit 30.

Particularly, the control unit 30 can cumulate the number of times of receiving the setting signal 210 or the start signal 200, which calculates the number of times of the trigger unit 2 located or not located in the fastening location 11 respectively and generates different storage values corresponding to each number of times for producing different effects respectively. Preferably, each time the effect unit 4 plays one of a plurality of sound recording files corresponding to each storage value in a sequential or random but not repeated way.

For example, a storage value with a 8-bit data size is stored in a memory unit, when a user inserts the trigger unit 2 into the fastening position 11 for the first time, the memory unit 34 stores a storage value of 00000001 in the binary code. Then, when the user pulls out the trigger unit 2 from the fastening position 11, the control unit 30 reads the storage value of 00000001 from the memory unit 34 and enables the effect unit 4 to play the first sound recording file. After that, when the user inserts the trigger unit 2 into the fastening position 11 for the second time, the memory unit 34 stores a storage value of 00000010 in the binary code. Then, when the user pulls out the trigger unit 2 from the fastening position 11, the control unit 30 reads the storage value of 00000010 from the memory unit 34 and enables the effect unit 4 to play the second sound recording file and so on. Therefore, in this exemplary embodiment, a user can get different interactive effect feedback by inserting the trigger unit 2 into the fastening position 11 each time respectively.

In addition, the circuit module 3 may comprise a power unit and a storage unit (not shown in figures). The power unit can be an external power supply or a battery to provide the operating power of the entire circuit module 3, and the storage unit is usable for storing information of effects such as multiple sound recording files and wherein it can be a USB storage device with an external USB port such as an USB drive, or be a memory card slot for inserting a memory card. Person having ordinary skill in the art can easily realize the above technic and it is not explained further here.

Figure 4A:
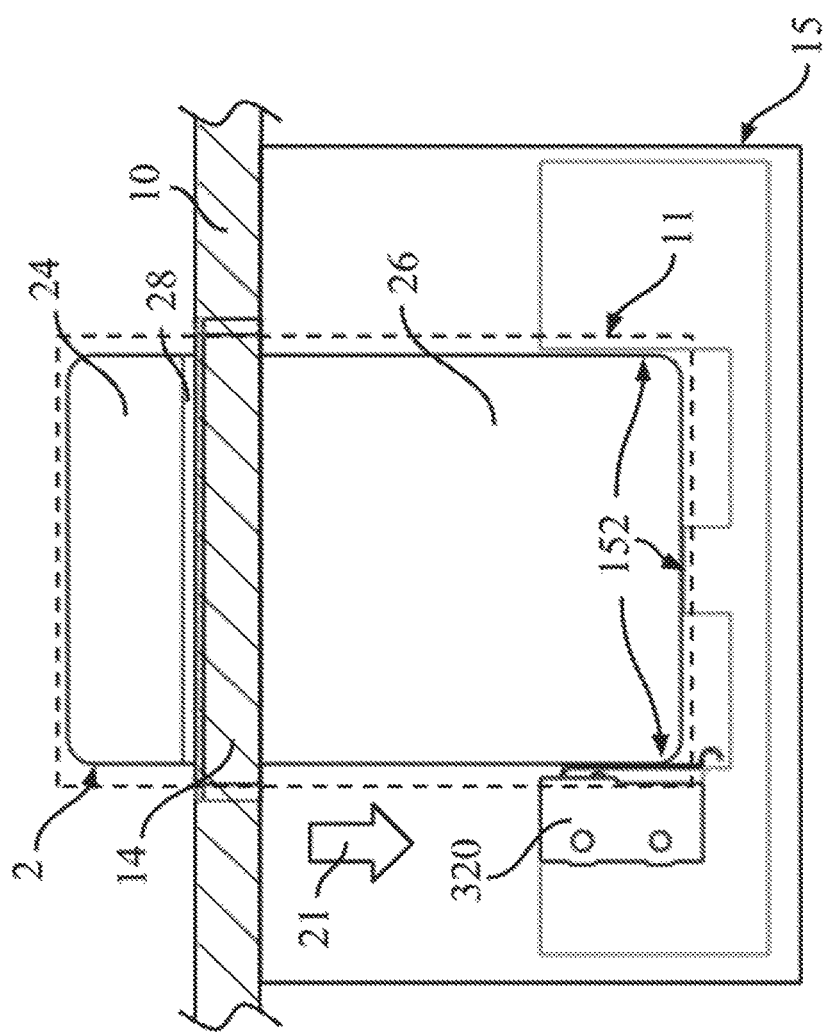
FIG. 4a is a front view diagram illustrating the trigger unit is moved into the housing space and is located in a fastening position of one exemplary embodiment of the present invention.
Figure 4B:
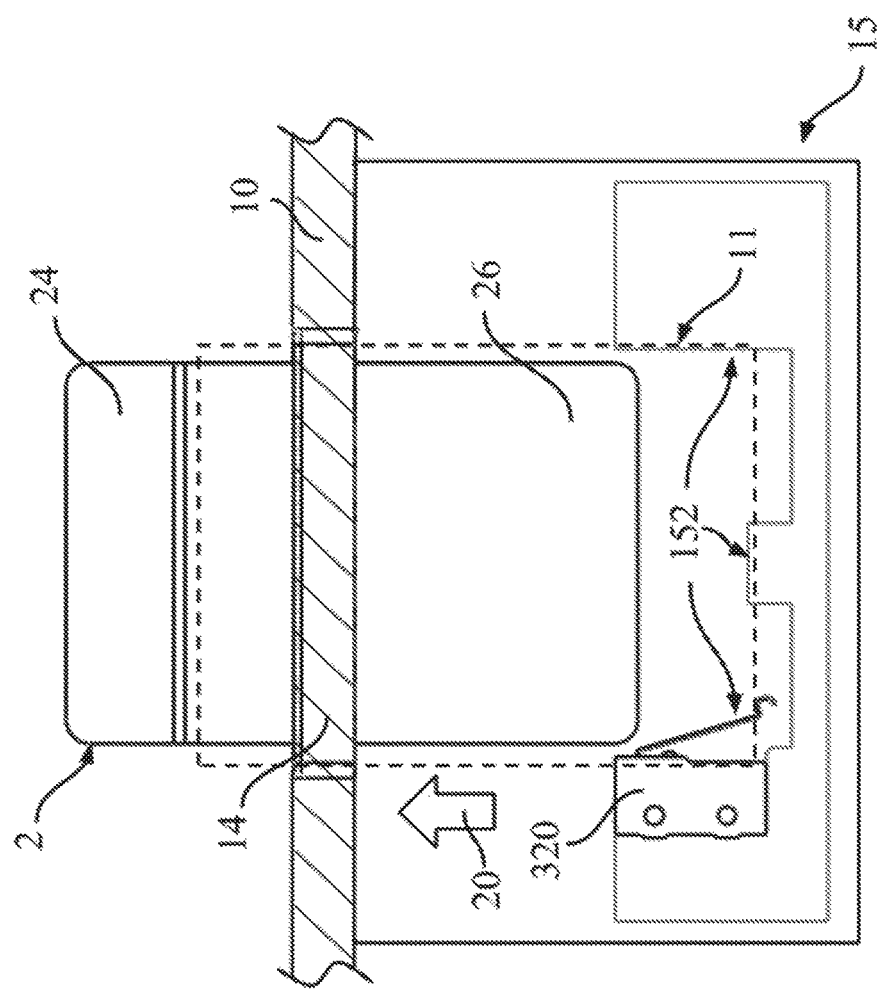
FIG. 4b is a front view diagram illustrating the the trigger unit is removed from the housing space and is not located in a fastening position of one exemplary embodiment of the present invention.

In this exemplary embodiment, as shown in FIG. 4a and FIG. 4b, the housing space 15 comprises at least one second limiter 152 mating with the shape of the trigger portion 26. When the trigger unit 2 is moved into the housing space 15 via the slot 14 and is located in the fastening position 11, the fastening position 11 is used for fastening the trigger unit 2 by means of that the second limiter 152 snaps, presses or leans against the trigger portion 26, which makes the trigger unit 2 not leave the fastening position 11 with the gravity force or any other accidental forces by the user. Wherein the second limiter 152 can be an elastic clip mated with the shape of the trigger portion 26, a pressing track, a leaning surface or any other mechanism with the effect of the travel limit or fastening.

The switch unit 32 comprises at least one switch 320 mated with the trigger portion 26 so that the switch unit 32 generates a setting signal 210 or a start signal 200 according to the on or off state of the switch 320 respectively. When the trigger unit 2 is moved 21 into the housing space 15 and is located in the fastening position 11, as shown in FIG. 4a, the shape of the trigger portion 26 makes the switch 320 in a first switch state while the switch unit 32 generates the setting signal 210 and outputs the setting signal 210 to the control unit 30. When the trigger unit 2 is removed 20 from the housing space 15 and is not located in the fastening position 11, as shown in FIG. 4b, the shape of the trigger portion 26 makes the switch 320 in a second switch state while the switch unit 32 generates the start signal 200 and outputs the start signal 200 to the control unit 30.

In this exemplary embodiment, the switch 320 can be a micro switch with an elastic clip which can be a part of the second limiter 152. When the switch 320 is in the first switch state, its elastic clip fully pressed down by the trigger portion 26 results in turning on the switch 320. When the switch 320 is in second switch state, the elastic clip not fully pressed down by the trigger portion 26 results in turning off the switch 320.

In this exemplary embodiment, the first switch state is ON and the second switch state is OFF, but person having ordinary skill in the art can easily realize that the first switch state could be designed as ON while the second switch state is OFF on the contrary and the switch states could be not limited to only two types, that is no doubt there are various circuit configurations corresponding to more than two switch states. In addition, different types of switch unit 32 and its switch 320 may have different installing methods and locations, the switch 320 is not necessary to be exact the same as a solid component of this exemplary embodiment and it can be built in the trigger portion 26 of the trigger unit 2 or/and the switch unit 32 separately, applying methods of mechanical touching, electric sensing, light sensing, infrared rays sensing, wireless signals transceiving, RF signals transceiving, magnetic sensing, vibration sensing or any other sensing methods for detecting the movement status of the trigger unit 2 so that the switch unit 32 can output the corresponding signals to the control unit 30.

Figure 5B:
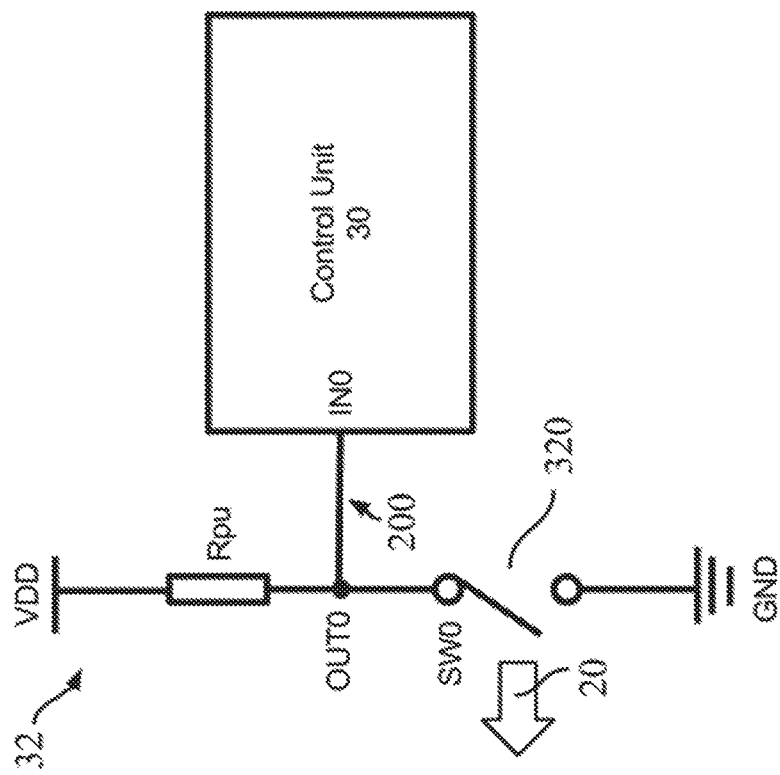
FIG. 5b is a circuit diagram of one exemplary embodiment of the present invention corresponding to FIG. 4b.
Figure 5A:
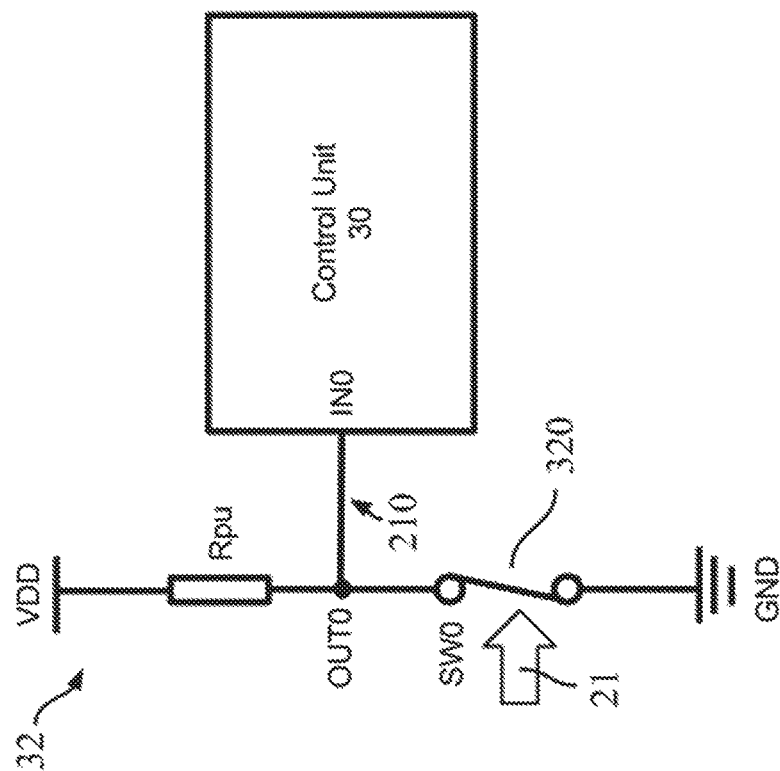

In this exemplary embodiment, corresponding to FIG. 4a and FIG. 4b, the switch unit 32 has a circuit configuration as FIGS. 5a and 5b for outputting corresponding signals from an output terminal OUT0 of the switch unit 32 to an input terminal IN of the control unit 30 according to the switch state of the switch 320 (SW0). The circuit configuration comprises a power supply VDD, a ground terminal GND and a pull-up resistor Rpu. These components are commonly seen in the pull-up configuration of the TTL logic circuit, that is, the power supply VDD connects to one end of the pull-up resistor Rpu, the output terminal OUT0 of the switch unit 32 connects to another end of the pull-up resistor Rpu, one end of the switch 320 (SW0) and the input terminal IN of the control unit 30 and wherein another end of the switch 320 (SW0) connects to the ground terminal GND.

When the trigger unit 2 is moved 21 into the housing space 15 and is located in the fastening position 11, as shown in FIG. 5a, the switch 320 (SW0) turns on so that the output terminal OUT0 of the switch unit 32 connects to GND and it outputs a setting signal 210 with a logic 0 to the input terminal IN of the control unit 30. When the trigger unit 2 is removed 20 from the housing space 15 and is not located in the fastening position 11, as shown in FIG. 5b, the switch 320 (SW0) turns off so that the voltage of the output terminal OUT0 of the switch unit 32 is close to the power supply VDD and it outputs a start signal 200 with a logic 0 to the input terminal IN of the control unit 30. In this exemplary embodiment, the setting signal 210 has a voltage level of logic 0 and the start signal 200 has a voltage level of logic 1, but person having ordinary skill in the art can easily realize that the setting signal 210 could be designed to have a voltage level of logic 1 while the start signal 200 has a voltage level of logic 0 on the contrary. Moreover, the switch unit 32 is not necessary to be a pull-up configuration as this exemplary embodiment, it could be pull-down configuration or any other kinds of configuration for outing different signal level according to each switch state of the switch 320.

Particularly, one frame 10 can mate with one or multiple trigger unit 2. By moving 21 and removing 20 operations mentioned above, each trigger unit 2 can trigger the each corresponding switch unit 32 of the circuit module 3 inside the housing space 15 to produce different effects. For example, a sound recording can be played if a user pulls out the first trigger unit, an odor can be releasing if the user pulls out the second trigger unit, a vibration can be generating if the user pulls out the third trigger unit. Wherein the exemplary embodiment of the single trigger unit 2 is described above, person having ordinary skill in the art can easily realize that the application of multiple trigger units is only the copy of this exemplary embodiment, and it is not explained further here.

Figure 6:
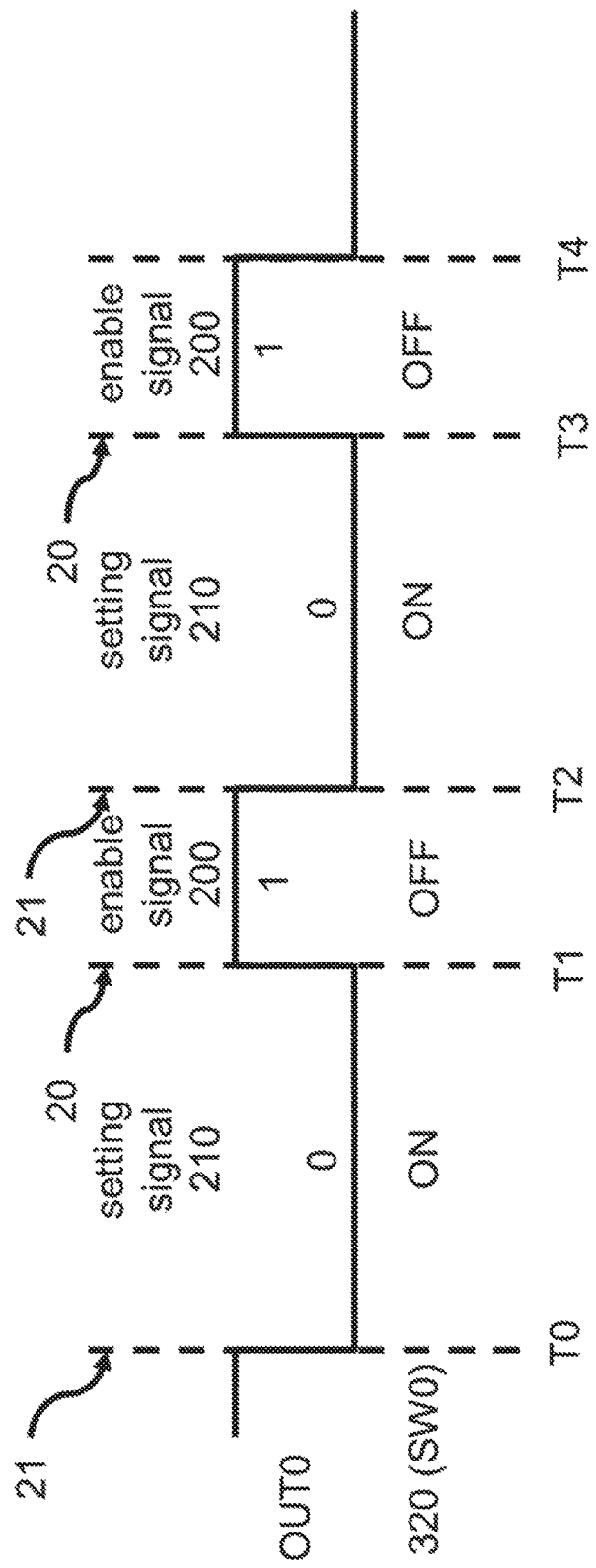
FIG. 6 is a timing sequence chart of one exemplary embodiment of the present invention corresponding to FIG. 5a and FIG. 5b.

In conclusion, the one exemplary embodiment of the present invention has an interactive method of the timing sequence chart of FIG. 6 corresponding to FIG. 5a and FIG. 5b:

At T0, a user moves 21 a trigger unit 2 into the housing space 15 of the frame 10 via a slot 14 of the frame 10 and move the trigger unit 2 until it is located in the fastening position 11 of the frame 10;

By mating the trigger portion 26 of the trigger unit 2 with a switch 320 (SW0), the switch 320 (SW0) is in the first switch state (turns on, ON) and the output terminal OUT0 of the switch unit 32 outputs a setting signal 210 with the voltage level of logic 0 to the input terminal IN of the control unit 30;

The control unit 30 generates a storage value in accordance with the setting signal 210, saves the storage value in the memory unit 34 and selectively disables the effect unit 4 to stop producing any effect;

At T1, the user removes 20 the trigger unit 2 from the housing space 15 of the frame 10 via the slot 14 of the frame 10 until the trigger unit 2 is not located in the fastening position 11 of the frame 10;

By mating the trigger portion 26 of the trigger unit 2 with the switch 320 (SW0), the switch 320 (SW0) is in the second switch state (turns off, OFF) and the output terminal OUT0 of the switch unit 32 outputs a start signal 200 with the voltage level of logic 1 to the input terminal IN of the control unit 30;

The control unit 30 reads the storage value from the memory unit 34 and enables the effect unit 4 to produce an effect corresponding to the storage value;

Then, methods after T2 are repeated as above.

II. The Second Exemplary Embodiment

Figure 7A:
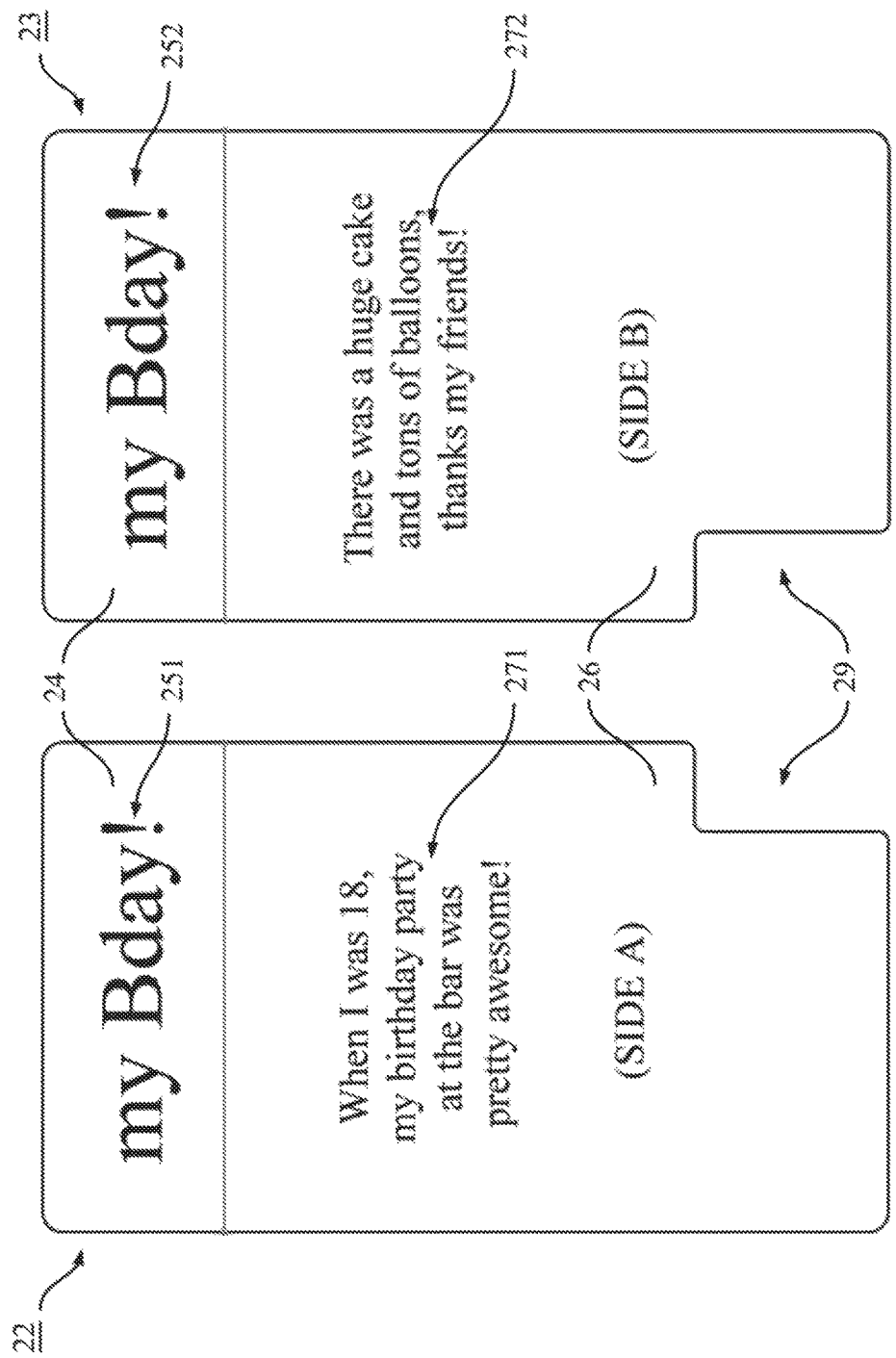
FIG. 7a, FIG. 7b and FIG. 7c are a front view diagram of the trigger unit of another exemplary embodiment of the present invention.
Figure 7B:
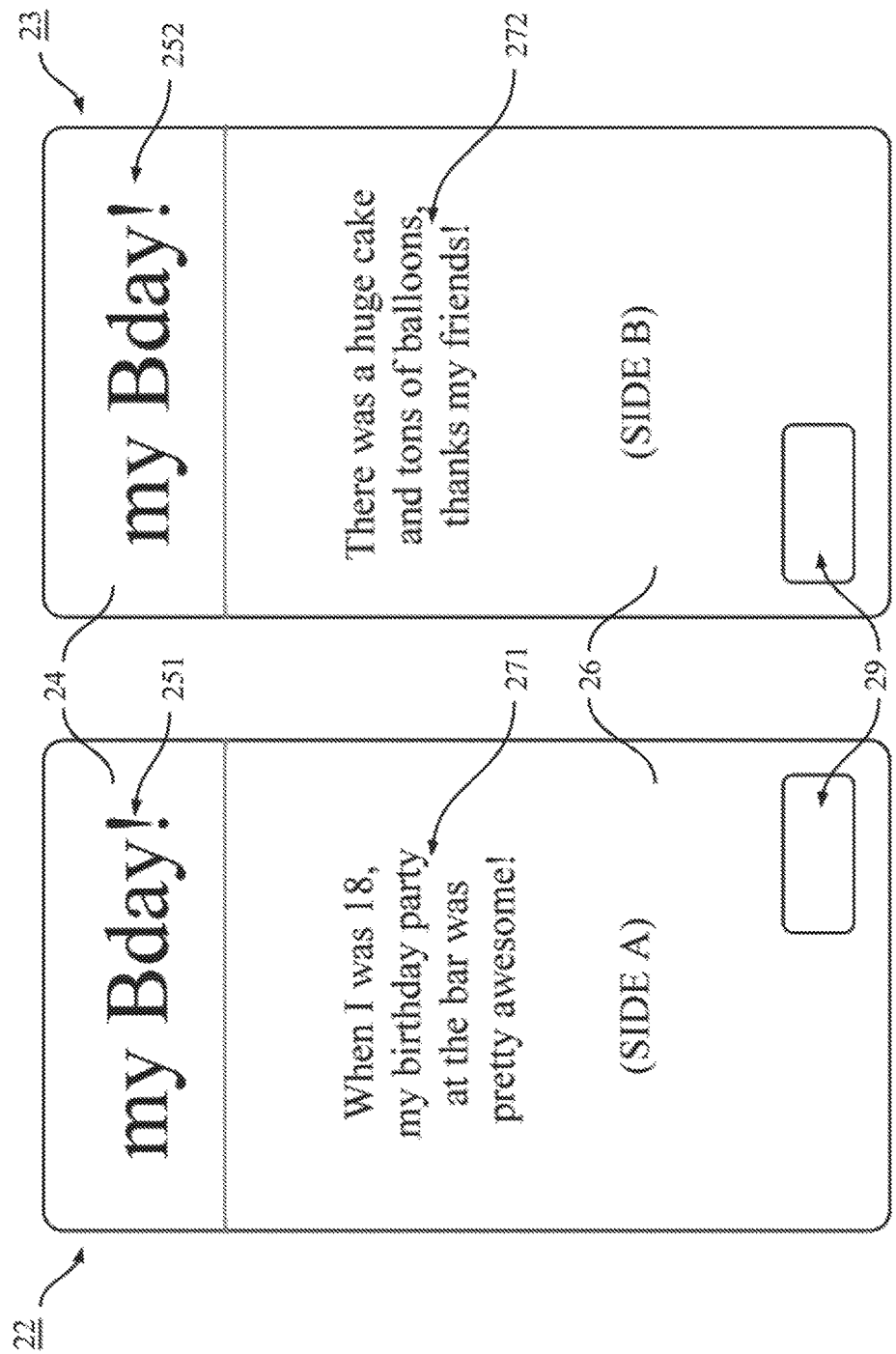
Figure 7C:
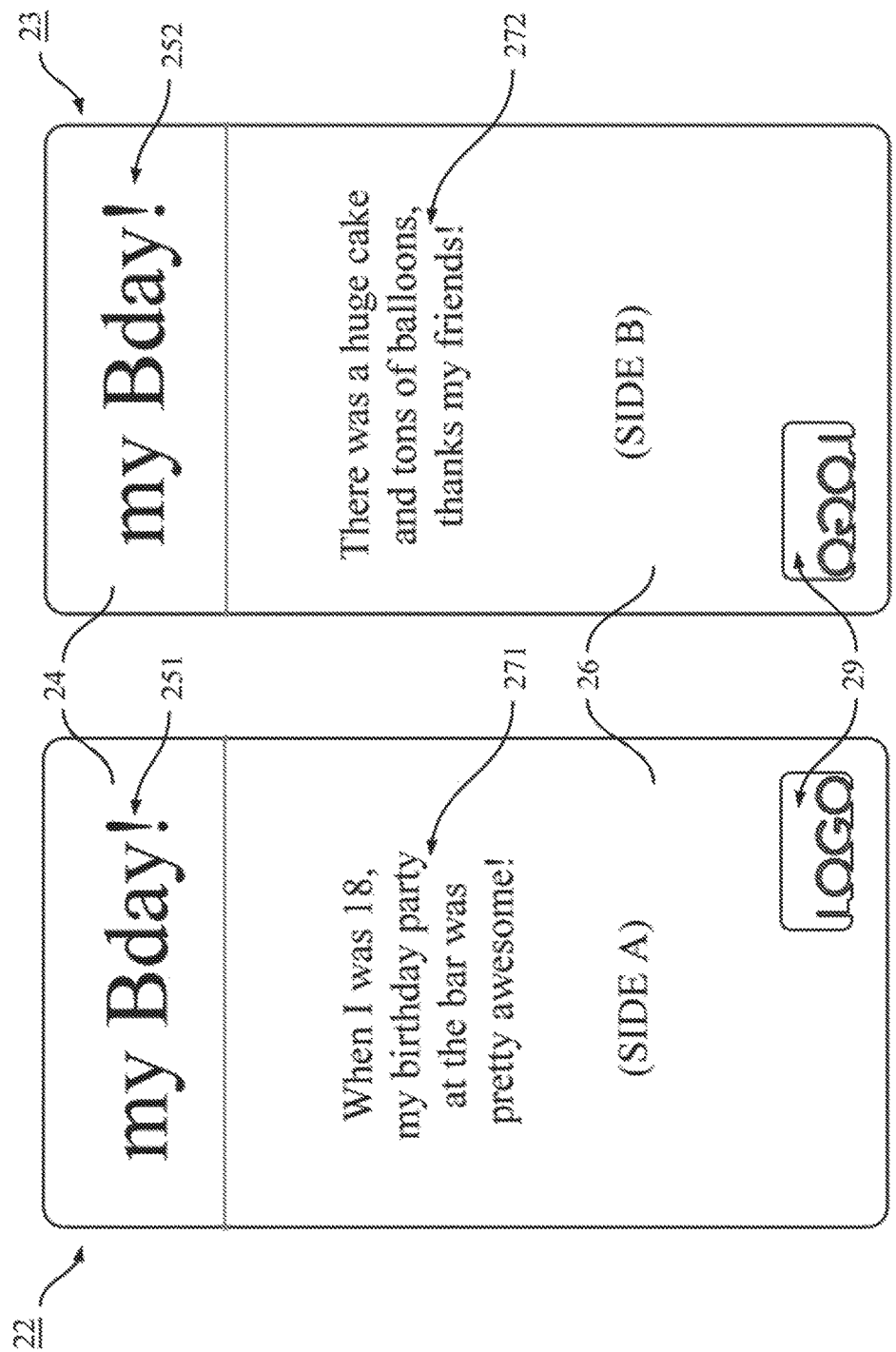

According to another exemplary embodiment of the present invention, as shown in FIG. 7a, FIG. 7b and FIG. 7c, which is suitable for identifying the direction when the trigger portion 26 of the trigger unit 2 is located in the fastening position 11. Particularly, the trigger portion 26 of the trigger unit 2 has asymmetric shapes 29 to identify a side A 22 and a side B 23 of it. Trigger portion 26 having these asymmetric shapes 29 is mated with the switch unit 32, these asymmetric shapes 29 at least comprises an unfilled corner, a hole, a trough and a projection, wherein at least comprising a figure, a text or any other design which is able to identify the side A 22 and a side B 23 of the trigger portion 26. It is not necessary to be exact the same as a solid shape of this exemplary embodiment and it can be built in the trigger portion 26 of the trigger unit 2 or/and the switch unit 32 separately, applying methods of mechanical touching, electric sensing, light sensing, infrared rays sensing, wireless signals transceiving, RF signals transceiving, magnetic sensing, vibration sensing or any other sensing methods for detecting the direction status of the trigger portion 26 of the trigger unit 2 located in the fastening position 11.

Figure 8:
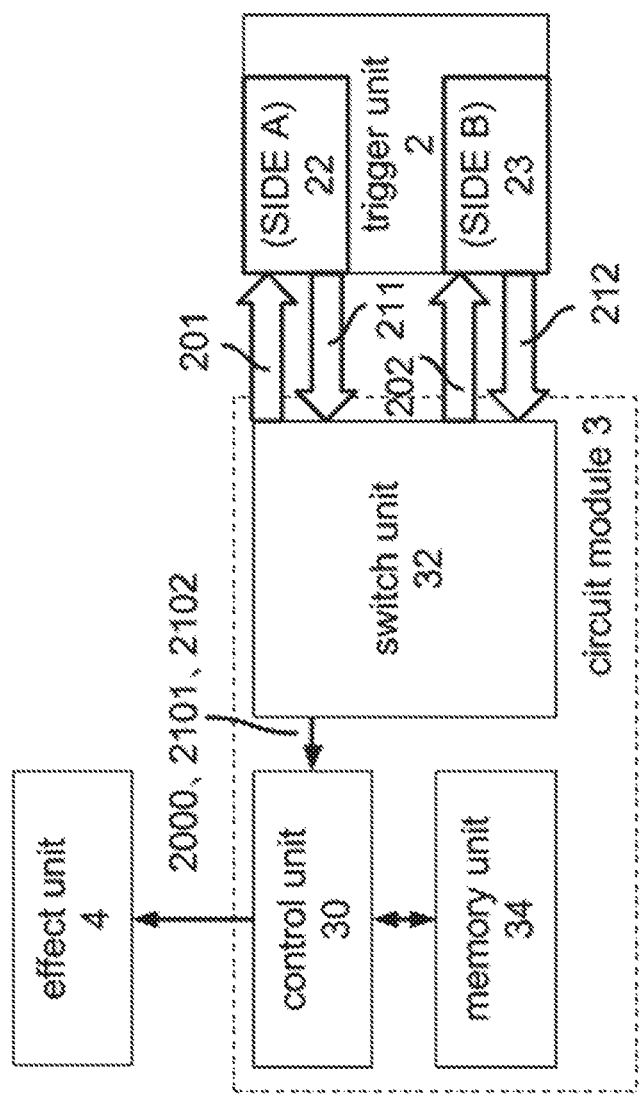
FIG. 8 is a systematic block diagram of another exemplary embodiment of the present invention.
Figure 9A:
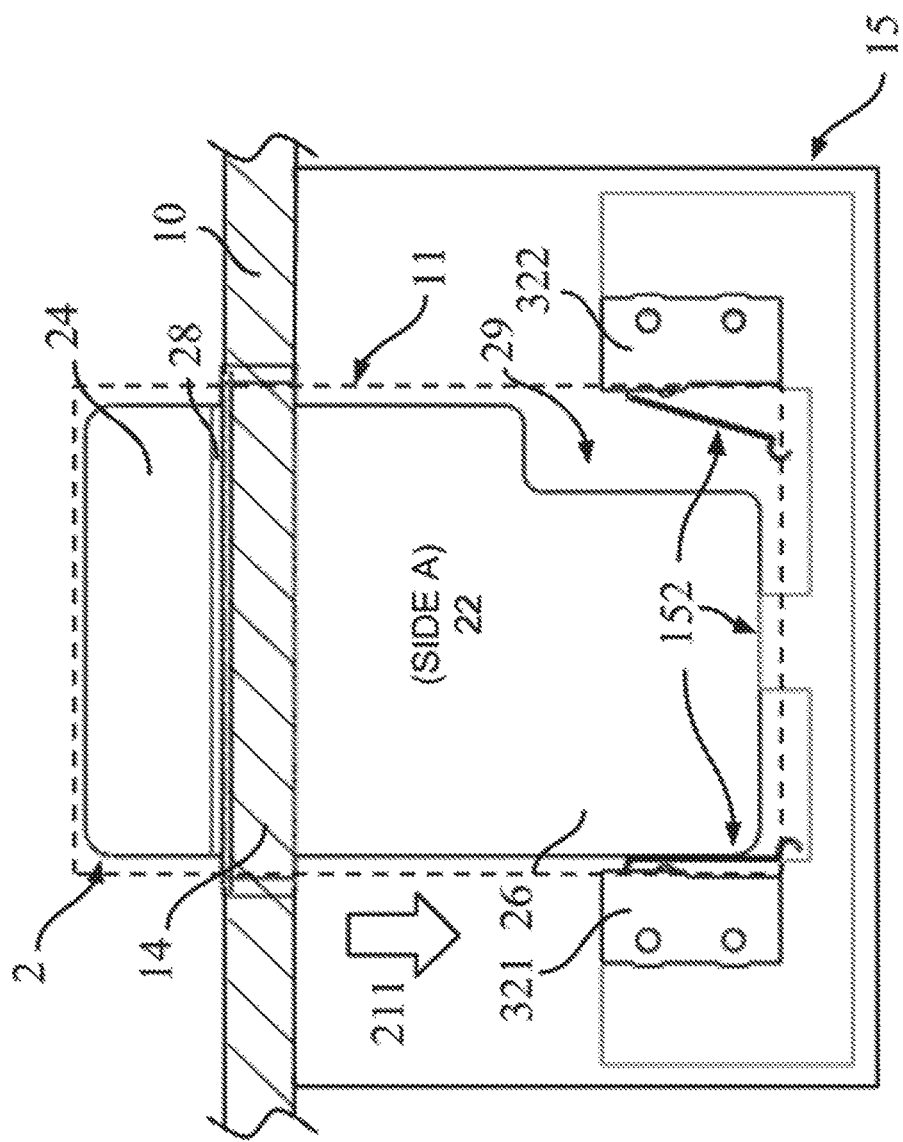
FIG. 9a is a front view diagram illustrating the trigger unit with its trigger portion in a first direction is moved into the housing space and is located in a fastening position of another exemplary embodiment of the present invention.
Figure 9B:
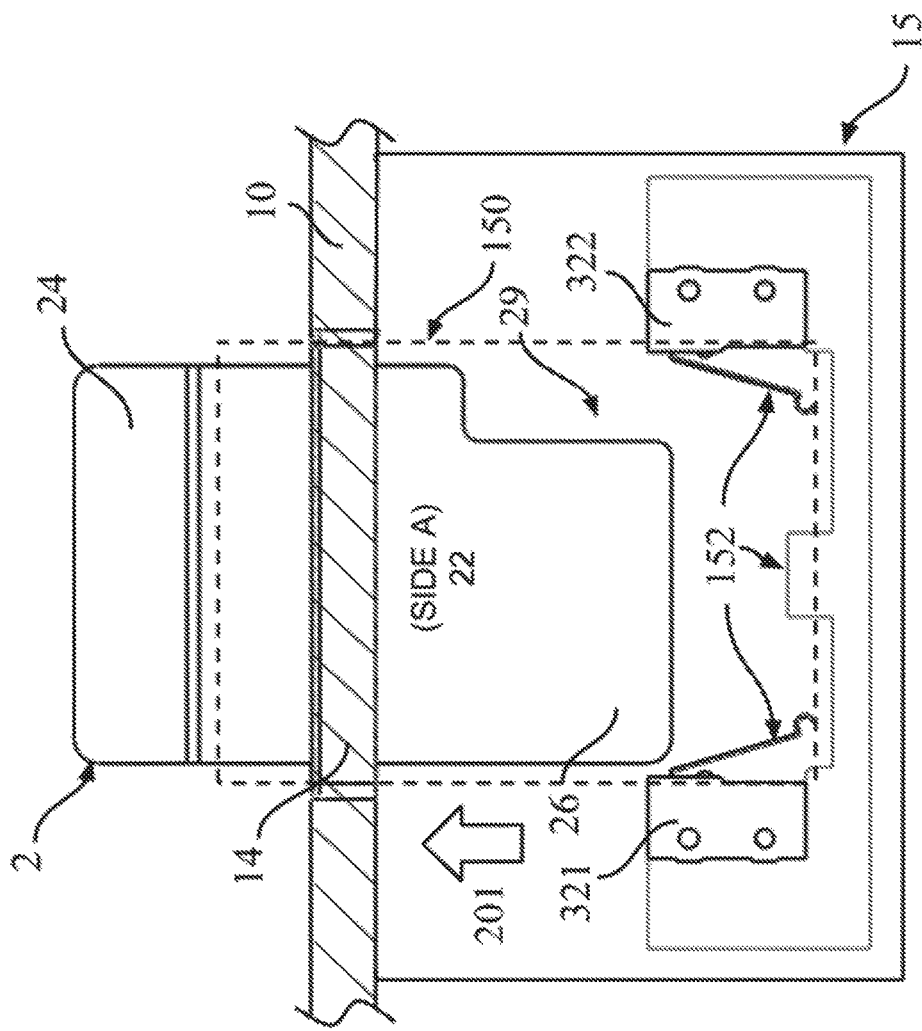
FIG. 9b is a front view diagram illustrating the trigger unit with its trigger portion in a first direction is removed from the housing space and is not located in a fastening position of another exemplary embodiment of the present invention.
Figure 10A:
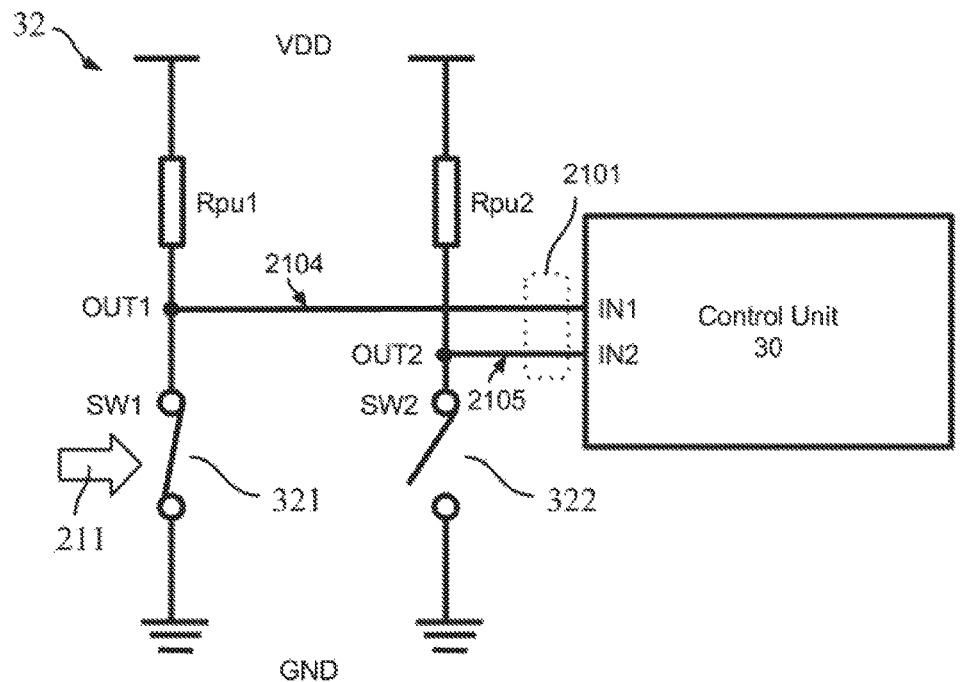
Figure 10B:
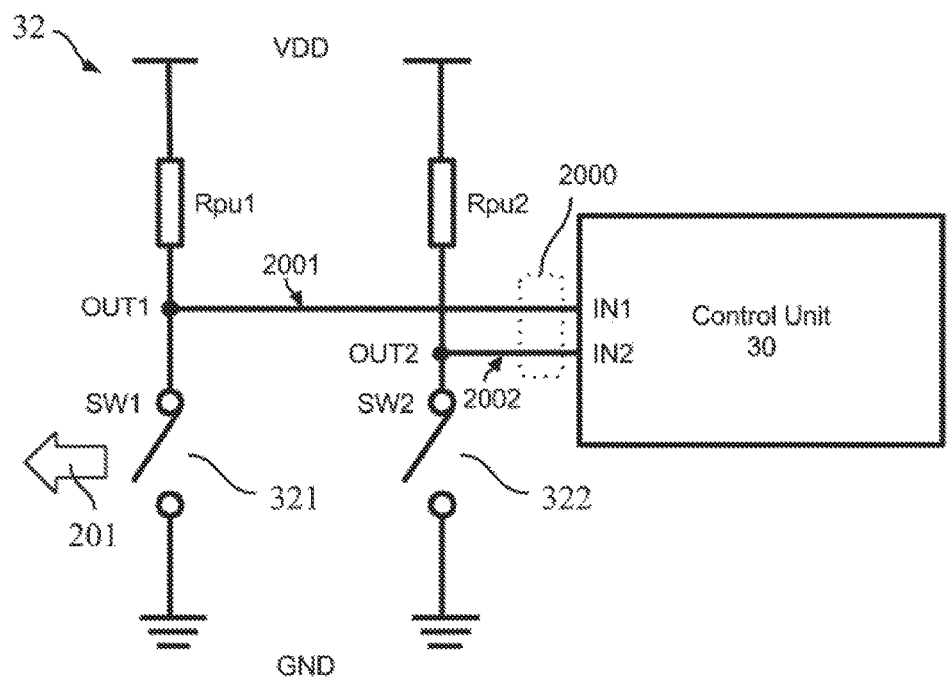
FIG. 10b is a circuit diagram of another exemplary embodiment of the present invention corresponding to FIG. 9b.
Figure 11A:
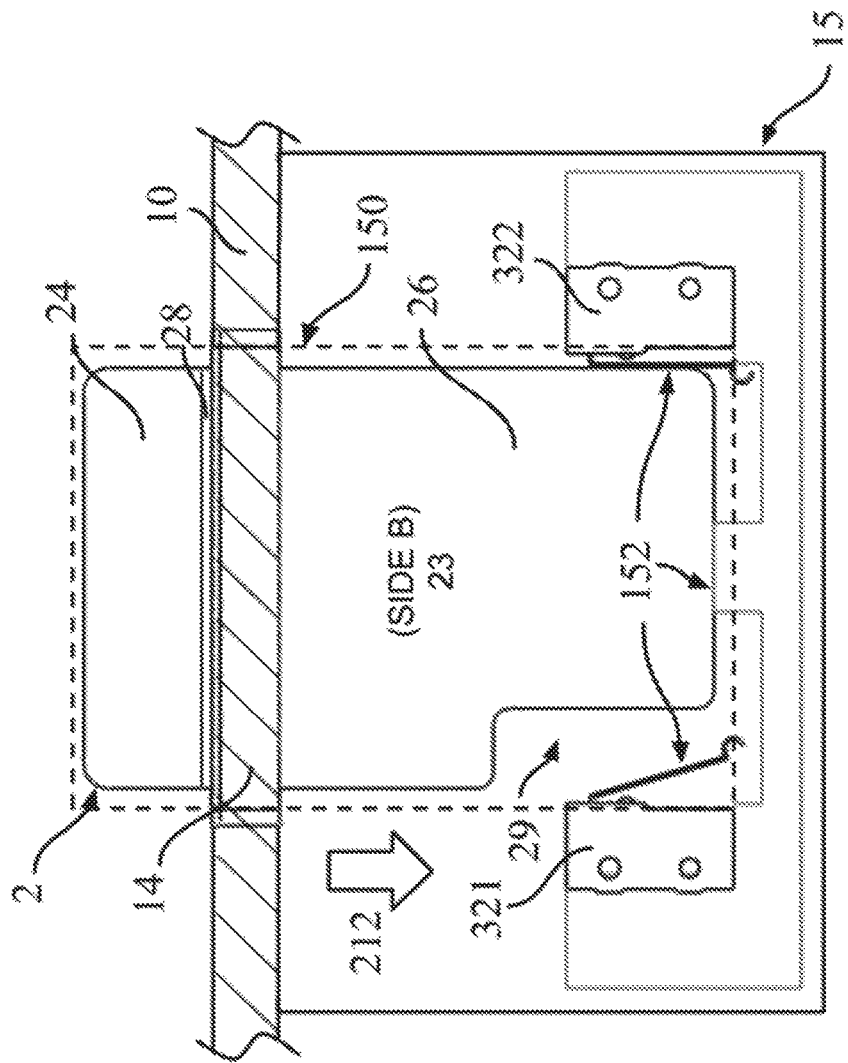
FIG. 11a is a front view diagram illustrating the trigger unit with its trigger portion in a second direction is moved into the housing space and is located in a fastening position of another exemplary embodiment of the present invention.
Figure 11B:
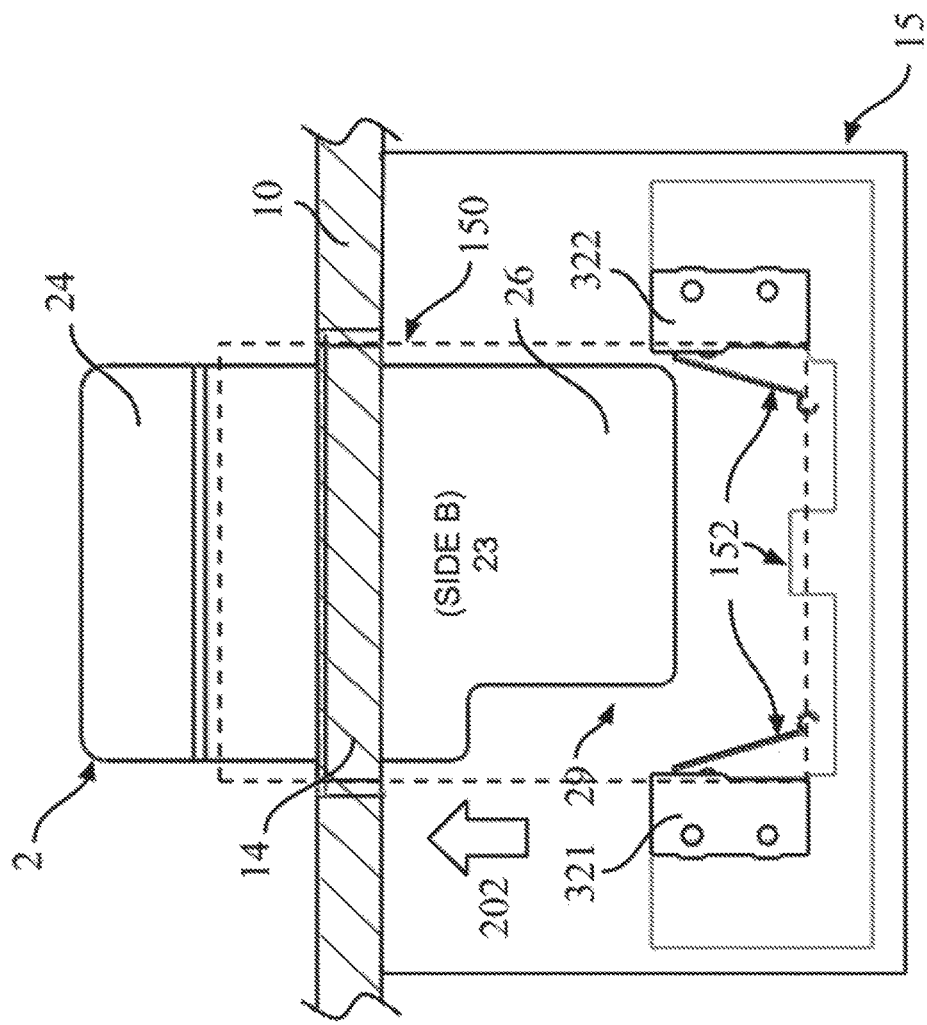
FIG. 11b is a front view diagram illustrating the trigger unit with its trigger portion in a second direction is removed from the housing space and is not located in a fastening position of another exemplary embodiment of the present invention.
Figure 12A:
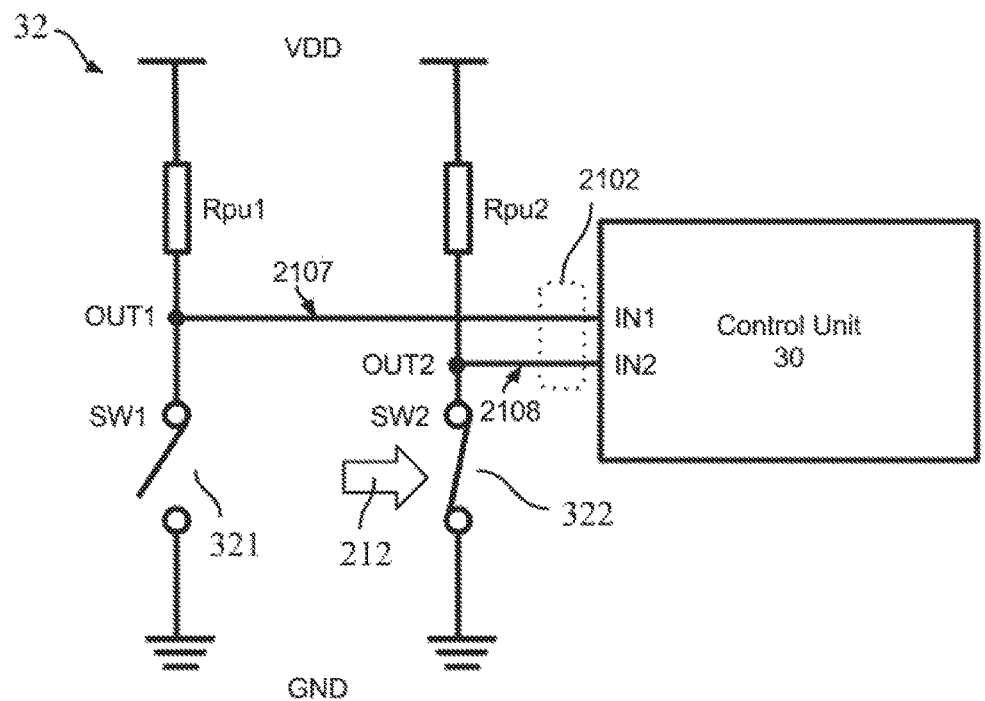
Figure 12B:
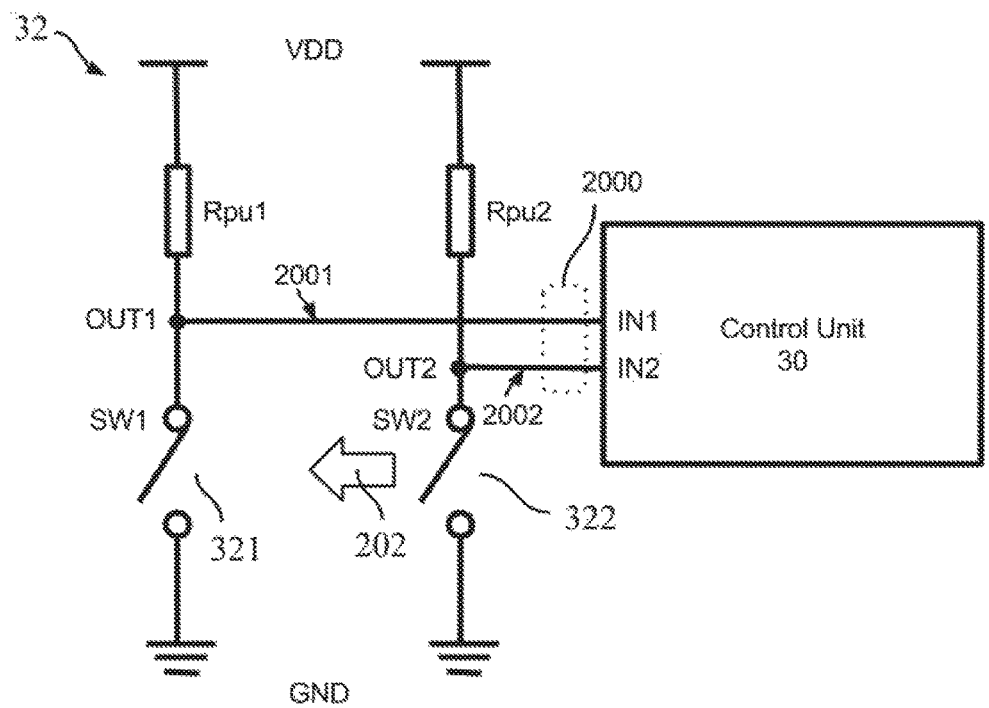
FIG. 12b is a circuit diagram of another exemplary embodiment of the present invention corresponding to FIG. 11b.

When the trigger unit 2 is moved 21 into or removed 20 from the housing space 15, comparing with the indistinctive direction of the trigger portion 26 in FIG. 3, directions of the trigger portion 26 of the trigger unit 2 in this exemplary embodiment as shown in FIG. 8 are identified as follow: the trigger portion 26 is moved 211 into the housing space 15 along the first direction, the trigger portion 26 is removed 201 from the housing space 15 along the first direction, the trigger portion 26 is moved 212 into the housing space 15 along the second direction and the trigger portion 26 is removed 202 from the housing space 15 along the second direction. Wherein the first direction can be but not limited to the direction that the side A 22 of the trigger portion 26 faces to the display surface 12 while the second direction can be but not limited to the direction that the side B 23 of the trigger portion 26 faces to the display surface 12, for example: the trigger portion 26 in the first direction can have one angle between the side A 22 and the display surface 12 while the trigger portion 26 in the second direction can also have another angle between the side A 22 and the display surface 12.

The main difference between this exemplary embodiment and the mentioned circuit module 3 of FIG. 3 is: if the trigger portion 26 of the trigger unit 2 is moved 211 into the housing space 15 along the first direction so that the trigger unit 2 is located in the fastening position 11, the trigger portion 26 in the first direction makes the switch unit 32 generate a first setting signal 2101 output the first setting signal 2101 to the control unit 30, wherein the control unit 30 generates a first storage value in accordance with the first setting signal 2101 and stores the first storage value in the memory unit 34. If the trigger portion 26 of the trigger unit 2 is moved 212 into the housing space 15 along the second direction so that the trigger unit 2 is located in the fastening position 11, the trigger portion 26 in the second direction makes the switch unit 32 generate a second setting signal 2102 and output the second setting signal 2102 to the control unit 30, wherein the control unit 30 generates a second storage value in accordance with the second setting signal 2102 and stores the second storage value in the memory unit 34. Wherein the control unit 30 can selectively disable the effect unit 4 to stop producing any effect after receiving the first setting signal 2101 and the second setting signal 2102, and can selectively turns off the system power supply to lower the power consumption after the first storage value or the second storage value is saved.

In addition, when the trigger portion 26 of the trigger unit 2 is removed 201 from the housing space 15 along the first direction or is removed 202 from the housing space 15 along the second direction so that the trigger unit 2 is not located in the fastening position 11, the trigger portion 26 of the trigger unit 2 makes the switch unit 32 generate a start signal 2000 and output the start signal 2000 to the control unit 30, wherein the control unit 30 reads the memory unit 4. If the memory unit 34 stores the first storage value, the control unit 30 enables the effect unit 4 in accordance with the first storage value to produce at least one first effect corresponding to the first storage value. And if the memory unit 34 stores the second storage value, the control unit 30 enables the effect unit 4 in accordance with the second storage value to produce at least one second effect corresponding to the second storage value. The control unit 30 can selectively turn on the system power supply to keep normal operation of all components while receiving the start signal 2000.

Particularly, the control unit 30 can cumulate the number of times of receiving the first setting signal 2101 or the second setting signal 2102, which calculates the number of times of the trigger unit 2 in the first direction or the second direction located in the fastening location 11 respectively and generates different first storage values and second storage values corresponding to each number of times for producing different first effects and second effects respectively. Preferably, each time the effect unit 4 plays one of a first or a second group of plurality of sound recording files corresponding to each first or second storage value in a sequential or random but not repeated way.

For example, a first and a second storage value with a 8-bit data size are stored in a memory unit, if a user inserts the trigger unit 2 into the fastening position 11 with the side A of the trigger portion 26 facing the display surface for the first time, the memory unit 34 stores a first storage value of 00000001 in the binary code, and if a user inserts the trigger unit 2 into the fastening position 11 with the side B of the trigger portion 26 facing the display surface for the first time, the memory unit 34 stores a second storage value of 00010000 in the binary code. Then, when the user pulls out the trigger unit 2 from the fastening position 11, the control unit 30 reads the memory unit 34. If the first storage value of 00000001 is in the memory unit 34, the control unit 30 enables the effect unit 4 to play the first sound recording file of a first group, and else if the second storage value of 00010000 is in the memory unit 34, the control unit 30 enables the effect unit 4 to play the first sound recording file of a second group. After that, when the user inserts the trigger unit 2 into the fastening position 11 with the side A of the trigger portion 26 facing the display surface for the second time, the memory unit 34 stores the first storage value of 00000010 in the binary code, and when the user inserts the trigger unit 2 into the fastening position 11 with the side B of the trigger portion 26 facing the display surface for the second time, the memory unit 34 stores the second storage value of 00100000 in the binary code. Then, when the user pulls out the trigger unit 2 from the fastening position 11, the control unit 30 reads the memory unit 34. If the first storage value of 00000010 is in the memory unit 34, the control unit 30 enables the effect unit 4 to play the second sound recording file of a first group, and else if the second storage value of 00100000 is in the memory unit 34, the control unit 30 enables the effect unit 4 to play the second sound recording file of a second group. Therefore, in this exemplary embodiment, a user can get different interactive effect feedback by inserting the trigger unit 2 into the fastening position 11 with the trigger portion 26 in the first or in the second direction each time respectively.

In this exemplary embodiment, as shown in FIG. 9a, FIG. 9b, FIG. 11a and FIG. 11b, the switch unit 32 comprising at least one first switch 321 and at least one second switch 322 mated with the trigger portion 26 with an asymmetric shape 29. In this exemplary embodiment, corresponding to FIG. 9a, FIG. 9b, FIG. 11a and FIG. 11b, the switch unit 32 has a circuit configuration as FIG. 10a, FIG. 10b, FIG. 12a and FIG. 12b for outputting corresponding signals from a first output terminal OUT1 and a second output terminal OUT2 of the switch unit 32 to a first input terminal IN1 and a second input terminal IN2 of the control unit 30 according to the switch state of the first switch 321 (SW1) and the second switch 322 (SW2) respectively. There is a first pull-up resistor Rpu1 and a second pull-up resistor Rpu2 corresponding to each circuit configuration. Mechanism and circuit configurations of the second exemplary embodiment are quite the same as the first exemplary embodiment mentioned above.

In this exemplary embodiment, one frame 10 can also mate with one or multiple trigger unit 2, wherein the exemplary embodiment of the single trigger unit 2 is described above, person having ordinary skill in the art can easily realize that the application of multiple trigger units is only the copy of this exemplary embodiment, and it is not explained further here.

Figure 13:
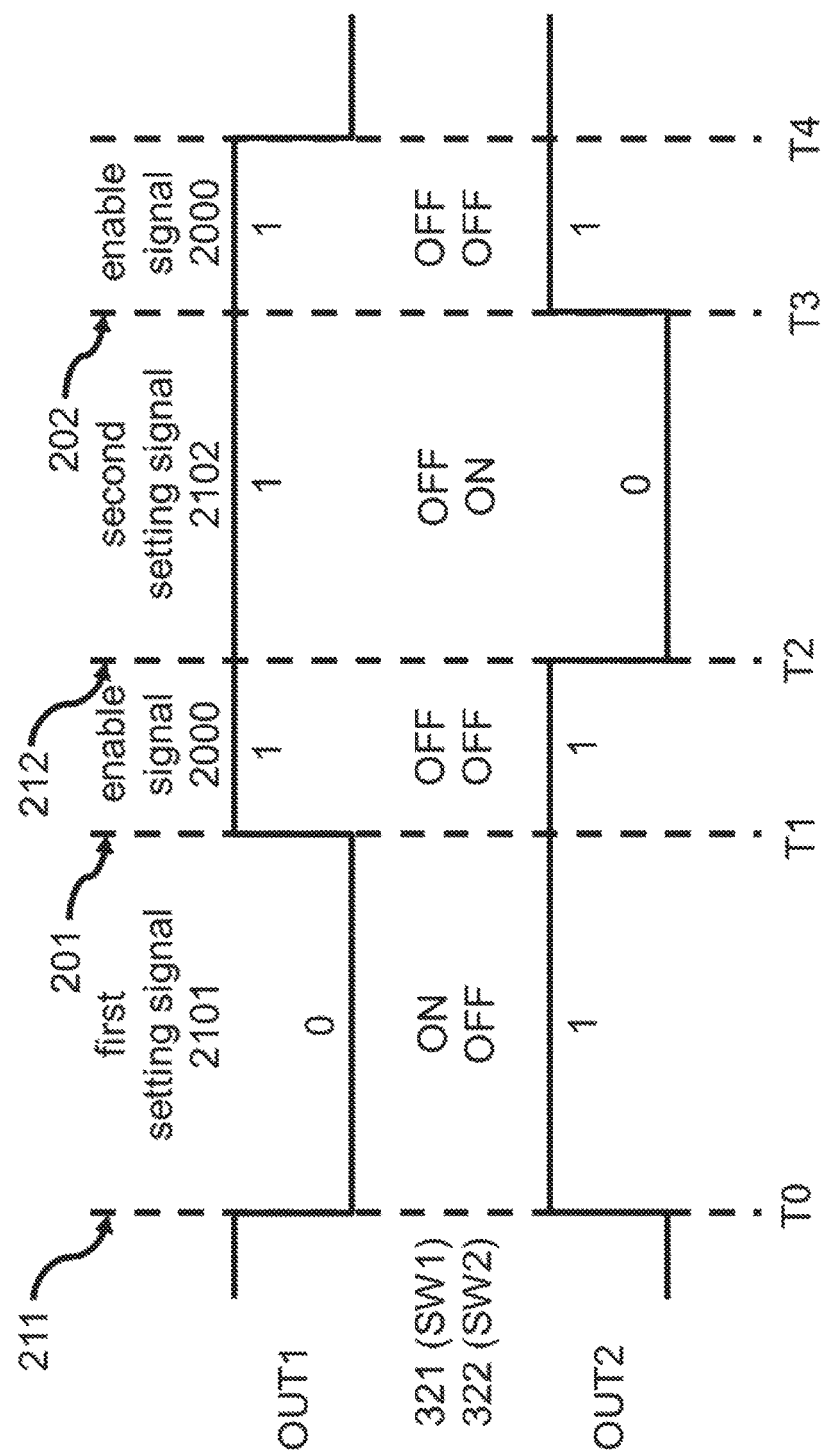
FIG. 13 is a timing sequence chart of another exemplary embodiment of the present invention corresponding to FIG. 10a, FIG. 10b, FIG. 12a and FIG. 12b.

In conclusion, the another exemplary embodiment of the present invention has an interactive method of the timing sequence chart of FIG. 13 corresponding to FIG. 10a, FIG. 10b, FIG. 12a and FIG. 12b:

At T0, a user moves 211 a trigger portion 26 of a trigger unit 2 along the first direction into the housing space 15 of the frame 10 via a slot 14 of the frame 10 and moves the trigger unit 2 until it is located in the fastening position 11 of the frame 10;

By mating the trigger portion 26 having the asymmetric shape 29 of the trigger unit 2 with a first switch 321 (SW1) and a second switch 322 (SW2), the trigger portion 26 along the first direction makes the first switch 321 (SW1) in the first switch state (turn on, ON) and the second switch 322 (SW2) in the second switch state (turn off, OFF), the first output terminal OUT1 and the second output terminal OUT2 of the control unit 32 output a first setting signal 2101 with a first bit 2104 of logic 0 and a second bit 2015 of logic 1 to the first input terminal IN1 and the second input terminal IN2 of the control unit 30 respectively;

The control unit 30 generates a first storage value in accordance with the first setting signal 2101, saves the first storage value in the memory unit 34 and selectively disables the effect unit 4 to stop producing any effect;

At T1, the user removes 201 the trigger portion 26 of the trigger unit 2 along the first direction from the housing space 15 of the frame 10 via the slot 14 of the frame 10 until the trigger unit 2 is not located in the fastening position 11 of the frame 10;

By mating the trigger portion 26 having the asymmetric shape 29 of the trigger unit 2 with a first switch 321(SW1) and a second switch 322(SW2), the trigger portion 26 makes the first switch 321 (SW1) and the second switch 322(SW2) both in the second switch state (turn off, OFF), the first output terminal OUT1 and the second output terminal OUT2 of the control unit 32 output a start signal 2000 with a first bit 2001 of logic 1 and a second bit 2002 of logic 1 to the first input terminal IN1 and the second input terminal IN2 of the control unit 30 respectively;

The control unit 30 reads the first storage value from the memory unit 34 and enables the effect unit 4 in accordance with the first storage value to produce a first effect corresponding to the first storage value;

At T2, a user moves 212 a trigger portion 26 of a trigger unit 2 along the second direction into the housing space 15 of the frame 10 via a slot 14 of the frame 10 and moves the trigger unit 2 until it is located in the fastening position 11 of the frame 10;

By mating the trigger portion 26 having the asymmetric shape 29 of the trigger unit 2 with a first switch 321(SW1) and a second switch 322(SW2), the trigger portion 26 along the second direction makes the first switch 321 (SW1) in the second switch state (turn off, OFF) and the second switch 322 (SW2) in the first switch state (turn on, ON), the first output terminal OUT1 and the second output terminal OUT2 of the control unit 32 output a second setting signal 2102 with a first bit 2107 of logic 1 and a second bit 2108 of logic 1 to the first input terminal IN1 and the second input terminal IN2 of the control unit 30 respectively;

The control unit 30 generates a second storage value in accordance with the second setting signal 2102, saves the second storage value in the memory unit 34 and selectively disables the effect unit 4 to stop producing any effect;

At T3, the user removes 202 the trigger portion 26 of the trigger unit 2 along the second direction from the housing space 15 of the frame 10 via the slot 14 of the frame 10 until the trigger unit 2 is not located in the fastening position 11 of the frame 10;

By mating the trigger portion 26 having the asymmetric shape 29 of the trigger unit 2 with a first switch 321 (SW1) and a second switch 322 (SW2), the trigger portion 26 makes the first switch 321 (SW1) and the second switch 322 (SW2) both in the second switch state (turn off, OFF), the first output terminal OUT1 and the second output terminal OUT2 of the control unit 32 output a start signal 2000 with a first bit 2001 of logic 1 and a second bit 2002 of logic 1 to the first input terminal IN1 and the second input terminal IN2 of the control unit 30 respectively;

The control unit 30 reads the second storage value from the memory unit 34 and enables the effect unit 4 in accordance with the second storage value to produce a second effect corresponding to the second storage value;

Then, methods after T4 are repeated as above.

Based on the above detailed description, the interactive image device and the interactive method thereof of the present invention provide an interactive image device that integrates a presented image with interactive effects and also an interactive method for manual operation of users.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any appropriate suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An interactive image device, at least comprising:
    a frame, provided with at least one fastening position, a housing space inside the frame and at least one display surface for presenting at least one image;
    an effect unit, arranged along the edge of the frame or inside the frame, for producing at least one effect;
    a circuit module, arranged in the housing space, at least comprising a control unit, a switch unit and a memory unit, wherein the control unit is electrically connected to the effect unit, the switch unit and the memory unit, and wherein the switch unit comprises at least one switch; and
    a trigger unit, wherein at one end of the trigger unit is provided with at least one trigger portion for mating with the at least one switch so that the switch unit generates a setting signal or a start signal according to the on or off state of the at least one switch respectively, and wherein:
        when the trigger unit is located in the fastening position, the at least one trigger portion makes the at least one switch in a first switch state so that the switch unit generates the setting signal and outputs the setting signal to the control unit, wherein the control unit generates a storage value in accordance with the setting signal, saves the storage value in the memory unit and selectively disables the effect unit to stop producing the at least one effect;

when the trigger unit is not located in the fastening position, the at least one trigger portion makes the at least one switch in a second switch state so that the switch unit generates the start signal and outputs the start signal to the control unit, wherein the control unit reads the storage value from the memory unit and enables the effect unit in accordance with the storage value to produce the at least one effect corresponding to the storage value; and wherein the control unit generates each the storage value corresponding to each number of times respectively by cumulating the number of times of receiving the setting signal and each the storage value is usable for producing different the at least one effect respectively.

2. The interactive image device of claim 1, wherein the first switch state is ON and the second switch state is OFF.

3. The interactive image device of claim 1, wherein the first switch state is OFF and the second switch state is ON.

4. The interactive image device of claim 1, wherein the setting signal has a voltage level of logic 0 and the start signal has a voltage level of logic 1.

5. The interactive image device of claim 1, wherein the setting signal has a voltage level of logic 1 and the start signal has a voltage level of logic 0.

6. The interactive image device of claim 1, wherein the frame comprises a slot arranged along the edge of the frame, and wherein the slot is usable for connecting through the housing space so that the trigger unit is able to move into or remove from the housing space through the slot to be located or not to be located in the fastening position respectively.

7. The interactive image device of claim 6, wherein the trigger unit is provided with at least one first limiter having a limiting surface with its cross-sectional area partially larger than the internal diameter of the slot, and wherein when the trigger unit moves into the housing space and locates in the fastening position, the at least one first limiter leans against the frame by the limiting surface so that the trigger unit stays in the fastening position.

8. The interactive image device of claim 1, wherein at another end of the trigger unit is provided with at least one holder portion for manual operation of the trigger unit.

9. The interactive image device of claim 1, wherein the housing space comprises at least one second limiter mating with the shape of the trigger portion, the fastening position is usable for fastening the trigger unit by the at least one second limiter.

10. The interactive image device of claim 1, wherein the at least one effect comprises a sound playing, a light changing, an odor releasing, a vibration generating or the image of the display surface changing.

11. An interactive image device, at least comprising:

a frame, provided with at least one fastening position, a housing space inside the frame and at least one display surface for presenting at least one image;

an effect unit, arranged along the edge of the frame or inside the frame, for producing at least one first effect and at least one second effect;

a circuit module, arranged in the housing space, at least comprising a control unit, a switch unit and a memory unit, wherein the control unit is electrically connected to the effect unit, the switch unit and the memory unit; and a trigger unit, wherein at one end of the trigger unit is provided with at least one trigger portion for mating with the switch unit so that the switch unit generates a first setting signal, a second setting signal or a start signal respectively, and wherein:

when the trigger unit with the at least one trigger portion in a first direction is located in the fastening position, the switch unit generates the first setting signal and outputs the first setting signal to the control unit, wherein the control unit generates a first storage value in accordance with the first setting signal, saves the first storage value in the memory unit and selectively disables the effect unit to stop producing the at least one first effect and the at least one second effect;

when the trigger unit with the at least one trigger portion in a second direction is located in the fastening position, the switch unit generates the second setting signal and outputs the second setting signal to the control unit, wherein the control unit generates a second storage value in accordance with the second setting signal, saves the second storage value in the memory unit and selectively disables the effect unit to stop producing the at least one first effect and the at least one second effect; and when the trigger unit is not located in the fastening position, the switch unit generates the start signal and outputs the start signal to the control unit, wherein the control unit reads the memory unit, and wherein:

if the memory unit stores the first storage value, the control unit enables the effect unit in accordance with the first storage value to produce the at least one first effect corresponding to the first storage value; and if the memory unit stores the second storage value, the control unit enables the effect unit in accordance with the second storage value to produce the at least one second effect corresponding to the second storage value.

12. The interactive image device of claim 11, wherein at least one trigger portion has an asymmetric shape or build-in sensing elements to identify a side A and a side B of the at least one trigger portion, and wherein:

the at least one trigger portion in the first direction has one angle between the side A and the display surface; and the at least one trigger portion in the second direction has another angle between the side A and the display surface.

13. The interactive image device of claim 11, wherein the control unit generates each the first storage value and the second storage value corresponding to each number of times respectively by cumulating the number of times of receiving the first setting signal and the second setting signal, and each the first storage value and the second storage value is usable for producing different the at least one first effect and the at least one second effect respectively.

14. The interactive image device of claim 11, wherein the frame comprises a slot arranged along the edge of the frame, and wherein the slot is usable for connecting through the housing space so that the trigger unit is able to move into or remove from the housing space through the slot to be located or not to be located in the fastening position respectively.

15. The interactive image device of claim 14, wherein the trigger unit is provided with at least one first limiter having a limiting surface with its cross-sectional area partially larger than the internal diameter of the slot, and wherein when the trigger unit moves into the housing space and locates in the fastening position, the at least one first limiter leans against the frame by the limiting surface so that the trigger unit stays in the fastening position.

16. The interactive image device of claim 11, wherein at another end of the trigger unit is provided with at least one holder portion for manual operation of the trigger unit.

17. The interactive image device of claim 11, wherein the housing space comprises at least one second limiter mating with the shape of the trigger portion, the fastening position is usable for fastening the trigger unit by the at least one second limiter.

18. The interactive image device of claim 11, wherein the at least one first effect and the at least one second effect comprises a sound playing, a light changing, an odor releasing, a vibration generating or the image of the display surface changing.

19. An interactive method for an image device, at least comprising:
- move at least one trigger unit into a housing space of a frame presenting at least an image;
- move the at least one trigger unit until it is located in a fastening position of the frame;
- mate at least one switch with at least one trigger portion of the at least one trigger unit;
- make the at least one switch in a first switch state;
- generate a setting signal;
- generate a storage value in accordance with the setting signal;
- save the storage value in a memory unit;
- selectively stop producing at least one effect;
- move the at least one trigger unit until it is not located in the fastening position of the frame;
- mate the at least one switch with the at least one trigger portion of the at least one trigger unit;
- make the at least one switch in a second switch state;
- generate a start signal;
- read the storage value from the memory unit;
- produce the at least one effect corresponding to the storage value; and
- wherein each the storage value is generated corresponding to each number of times respectively by cumulating the number of times of receiving the setting signal and each the storage value is usable for producing different the at least one effect respectively.

20. An interactive method for an image device, at least comprising:
- move at least one trigger unit along a first direction into a housing space of a frame presenting at least an image;
- move the at least one trigger unit until it is located in a fastening position of the frame;
- mate a switch unit with at least one trigger portion of the at least one trigger unit;
- generate a first setting signal;
- generate a first storage value in accordance with the first setting signal;
- save the first storage value in a memory unit;
- selectively stop producing at least one first effect and at least one second effect;
- move the at least one trigger unit until it is not located in the fastening position of the frame;
- mate the switch unit with the at least one trigger portion of the at least one trigger unit;
- generate a start signal;
- read the first storage value from the memory unit;
- produce the at least one first effect corresponding to the first storage value;
- move the at least one trigger unit along a second direction into the housing space of the frame presenting the at least one image;
- move the at least one trigger unit until it is located in the fastening position of the frame;
- mate the switch unit with the at least one trigger portion of the at least one trigger unit;
- generate a second setting signal;
- generate a second storage value in accordance with the second setting signal;
- save the second storage value in the memory unit;
- selectively stop producing the at least one first effect and the at least one second effect;
- move the at least one trigger unit until it is not located in the fastening position of the frame;
- mate the switch unit with the at least one trigger portion of the at least one trigger unit;
- generate the start signal;
- read the second storage value from the memory unit; and
- produce the at least one second effect corresponding to the second storage value.

* * * * *